(12) United States Patent
de Vries et al.

(10) Patent No.: US 11,119,884 B2
(45) Date of Patent: *Sep. 14, 2021

(54) DERIVING COMPONENT STATISTICS FOR A STREAM ENABLED APPLICATION

(71) Applicant: Numecent Holdings, Inc., Irvine, CA (US)

(72) Inventors: Jeffrey de Vries, Sunnyvale, CA (US); Arthur S. Hitomi, Huntington Beach, CA (US)

(73) Assignee: NUMECENT HOLDINGS, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,918

(22) Filed: Oct. 15, 2019

(65) Prior Publication Data
US 2020/0117571 A1    Apr. 16, 2020

Related U.S. Application Data

(63) Continuation of application No. 15/133,730, filed on Apr. 20, 2016, now Pat. No. 10,445,210, which is a
(Continued)

(51) Int. Cl.
*G06F 9/445* (2018.01)
*G06F 11/34* (2006.01)
(Continued)

(52) U.S. Cl.
CPC ........ *G06F 11/3476* (2013.01); *G06F 9/3851* (2013.01); *G06F 9/463* (2013.01);
(Continued)

(58) Field of Classification Search
CPC .................................................. G06F 11/3476
(Continued)

(56) References Cited

U.S. PATENT DOCUMENTS 4,562,306 A    12/1985  Chuo
4,796,220 A     1/1989  Wolfe
(Continued)

FOREIGN PATENT DOCUMENTS

EP    0813325    12/1997
EP    0658837     6/2000
(Continued)

OTHER PUBLICATIONS

Bailey, Peter et al., "Chart of Darkness: Mapping a Large Intranet," Dept. of Computer Science, FEIT, The Australian National University, Canberra ACT 0200, Australia, pp. 1-23, Nov. 11, 1999 [retrieved online at http://research.microsoft.com/en-us/um/people/nickcr/pubs/bailey_tr00.pdf].
(Continued)

*Primary Examiner* — Francisco J Aponte
(74) *Attorney, Agent, or Firm* — Ahmann Kloke LLP

(57) ABSTRACT

A technique for generating component usage statistics involves associating components with blocks of a stream-enabled application. When the streaming application is executed, block requests may be logged by Block ID in a log. The frequency of component use may be estimated by analyzing the block request log with the block associations.

21 Claims, 17 Drawing Sheets

Related U.S. Application Data continuation of application No. 14/499,619, filed on Sep. 29, 2014, now Pat. No. 9,436,578, which is a continuation of application No. 12/062,766, filed on Apr. 4, 2008, now Pat. No. 8,892,738.

(60) Provisional application No. 60/986,260, filed on Nov. 7, 2007.

(51) Int. Cl.
  *G06F 9/46* (2006.01)
  *G06F 17/18* (2006.01)
  *G06F 9/38* (2018.01)
  *H04L 29/06* (2006.01)
  *H04L 12/26* (2006.01)
  *H04L 29/08* (2006.01)

(52) U.S. Cl.
  CPC .............. *G06F 17/18* (2013.01); *H04L 43/04* (2013.01); *H04L 65/604* (2013.01); *H04L 67/16* (2013.01); *H04L 67/42* (2013.01); *G06F 2201/865* (2013.01)

(58) Field of Classification Search
  USPC ......................................................... 717/174
  See application file for complete search history.

(56) References Cited

U.S. PATENT DOCUMENTS

| | | |
|---|---|---|
| 4,949,257 A | 8/1990 | Orbach |
| 4,970,504 A | 11/1990 | Chen |
| 4,999,806 A | 3/1991 | Chernow |
| 5,012,512 A | 4/1991 | Basso |
| 5,032,979 A | 7/1991 | Hecht |
| 5,047,928 A | 9/1991 | Wiedemer |
| 5,063,500 A | 11/1991 | Shorter |
| 5,109,413 A | 4/1992 | Comeford |
| 5,166,886 A | 11/1992 | Molnar |
| 5,210,850 A | 5/1993 | Kelly |
| 5,293,556 A | 3/1994 | Hill |
| 5,311,596 A | 5/1994 | Scott |
| 5,325,489 A | 6/1994 | Mitsuhira |
| 5,442,791 A | 8/1995 | Wrabetz |
| 5,481,611 A | 1/1996 | Owens |
| 5,495,411 A | 2/1996 | Ananda |
| 5,533,123 A | 7/1996 | Force |
| 5,537,566 A | 7/1996 | Konno |
| 5,544,321 A | 8/1996 | Theimer |
| 5,546,526 A | 8/1996 | Li |
| 5,547,202 A | 8/1996 | Tsumura |
| 5,548,645 A | 8/1996 | Ananda |
| 5,553,139 A | 9/1996 | Ross |
| 5,553,143 A | 9/1996 | Ross |
| 5,555,376 A | 9/1996 | Theimer |
| 5,611,050 A | 3/1997 | Theimer |
| 5,629,980 A | 5/1997 | Stefik |
| 5,630,049 A | 5/1997 | Cardoza |
| 5,635,906 A | 6/1997 | Joseph |
| 5,638,513 A | 6/1997 | Ananda |
| 5,652,887 A | 7/1997 | Dewey |
| 5,666,293 A | 9/1997 | Metz |
| 5,696,965 A | 12/1997 | Dedrick |
| 5,701,427 A | 12/1997 | Lathrop |
| 5,706,440 A | 1/1998 | Compliment |
| 5,715,403 A | 2/1998 | Stefik |
| 5,758,150 A | 5/1998 | Bell |
| 5,761,445 A | 6/1998 | Nguyen |
| 5,764,906 A | 6/1998 | Edelstein |
| 5,764,918 A | 6/1998 | Poulter |
| 5,765,152 A | 6/1998 | Erickson |
| 5,765,153 A | 6/1998 | Benantar |
| 5,768,528 A | 6/1998 | Stumm |
| 5,768,539 A | 6/1998 | Metz |
| 5,771,354 A | 6/1998 | Crawford |
| 5,778,395 A | 7/1998 | Whiting |
| 5,790,753 A | 8/1998 | Krishnamoorthy |
| 5,805,809 A | 9/1998 | Singh |
| 5,809,144 A | 9/1998 | Sirbu |
| 5,812,865 A | 9/1998 | Theimer |
| 5,812,881 A | 9/1998 | Ku |
| 5,818,711 A | 10/1998 | Schwabe |
| 5,822,537 A | 10/1998 | Katseff |
| 5,832,289 A | 11/1998 | Shaw |
| 5,835,722 A | 11/1998 | Bradshaw |
| 5,838,910 A | 11/1998 | Domenikos |
| 5,839,910 A | 11/1998 | Meller |
| 5,855,020 A | 12/1998 | Kirsch |
| 5,874,986 A | 2/1999 | Gibbon |
| 5,878,425 A | 3/1999 | Redpath |
| 5,881,229 A | 3/1999 | Singh |
| 5,881,232 A | 3/1999 | Cheng |
| 5,892,915 A | 4/1999 | Duso |
| 5,892,953 A | 4/1999 | Bhagria |
| 5,895,454 A | 4/1999 | Harrington |
| 5,895,471 A | 4/1999 | King |
| 5,901,315 A | 5/1999 | Edwards |
| 5,903,721 A | 5/1999 | Sixtus |
| 5,903,732 A | 5/1999 | Reed |
| 5,903,892 A | 5/1999 | Hoffert |
| 5,905,868 A | 5/1999 | Baghai |
| 5,905,990 A | 5/1999 | Inglett |
| 5,909,545 A | 5/1999 | Frese |
| 5,911,043 A | 6/1999 | Duffy |
| 5,918,015 A | 6/1999 | Suzuki |
| 5,923,885 A | 7/1999 | Johnson |
| 5,925,126 A | 7/1999 | Hsieh |
| 5,926,552 A | 7/1999 | Mckeon |
| 5,929,849 A | 7/1999 | Kikinis |
| 5,931,907 A | 8/1999 | Davies |
| 5,933,603 A | 8/1999 | Vahalia |
| 5,933,822 A | 8/1999 | Braden-Harder |
| 5,940,591 A | 8/1999 | Boyle |
| 5,943,424 A | 8/1999 | Berger |
| 5,948,062 A | 8/1999 | Tzelnic |
| 5,948,065 A | 9/1999 | Eilert |
| 5,949,877 A | 9/1999 | Traw |
| 5,950,195 A | 9/1999 | Stockwell |
| 5,953,506 A | 9/1999 | Kalra |
| 5,956,717 A | 9/1999 | Kraay |
| 5,960,411 A | 9/1999 | Hartman |
| 5,960,439 A | 9/1999 | Hamner |
| 5,961,586 A | 10/1999 | Pedersen |
| 5,961,591 A | 10/1999 | Jones |
| 5,963,444 A | 10/1999 | Shidara |
| 5,963,944 A | 10/1999 | Adams |
| 5,968,176 A | 10/1999 | Nessett |
| 5,973,696 A | 10/1999 | Arganat |
| 5,987,454 A | 11/1999 | Hobbs |
| 5,987,608 A | 11/1999 | Roskind |
| 6,003,065 A | 12/1999 | Yan |
| 6,003,095 A | 12/1999 | Pekowski |
| 6,014,686 A | 1/2000 | Elnozahy |
| 6,018,619 A | 1/2000 | Allard |
| 6,026,166 A | 2/2000 | LeBourgeois |
| 6,028,925 A | 2/2000 | Van Berkum |
| 6,038,379 A | 3/2000 | Fletcher |
| 6,038,610 A | 3/2000 | Belfiore |
| 6,047,323 A | 4/2000 | Krause |
| 6,049,792 A | 4/2000 | Hart |
| 6,049,835 A | 4/2000 | Gagnon |
| 6,061,738 A | 5/2000 | Osaku |
| 6,065,043 A | 5/2000 | Domenikos |
| 6,076,104 A | 6/2000 | McCue |
| 6,081,842 A | 6/2000 | Shachar |
| 6,085,186 A | 7/2000 | Christianson |
| 6,085,193 A | 7/2000 | Malkin |
| 6,088,705 A | 7/2000 | Lightstone |
| 6,092,194 A | 7/2000 | Touboul |
| 6,094,649 A | 7/2000 | Bowen |
| 6,098,072 A | 8/2000 | Sluiman |
| 6,099,408 A | 8/2000 | Schneier |
| 6,101,482 A | 8/2000 | Diangelo |
| 6,101,491 A | 8/2000 | Woods |

(56) References Cited

U.S. PATENT DOCUMENTS

| | | | |
|---|---|---|---|
| 6,101,537 A | 8/2000 | Edelstein | |
| 6,105,029 A * | 8/2000 | Maddalozzo, Jr. | H04L 29/06 |
| 6,108,420 A | 8/2000 | Larose | |
| 6,115,741 A | 9/2000 | Domenikos | |
| 6,138,271 A | 10/2000 | Keeley | |
| 6,154,878 A | 11/2000 | Saboff | |
| 6,157,948 A | 12/2000 | Inoue | |
| 6,167,510 A | 12/2000 | Tran | |
| 6,167,522 A | 12/2000 | Lee | |
| 6,173,311 B1 | 1/2001 | Hassett | |
| 6,173,330 B1 | 1/2001 | Guo | |
| 6,185,608 B1 | 2/2001 | Hon | |
| 6,192,398 B1 | 2/2001 | Hunt | |
| 6,192,408 B1 | 2/2001 | Vahalia | |
| 6,195,694 B1 | 2/2001 | Chen | |
| 6,212,640 B1 | 4/2001 | Abdelnur | |
| 6,219,693 B1 | 4/2001 | Napolitano | |
| 6,226,412 B1 | 5/2001 | Schwab | |
| 6,226,665 B1 | 5/2001 | Deo | |
| 6,253,234 B1 | 6/2001 | Hunt | |
| 6,275,470 B1 | 8/2001 | Ricciulli | |
| 6,275,496 B1 | 8/2001 | Burns | |
| 6,278,992 B1 | 8/2001 | Curtis | |
| 6,281,898 B1 | 8/2001 | Nikolovska | |
| 6,282,712 B1 | 8/2001 | Davis | |
| 6,298,356 B1 | 10/2001 | Jawahar | |
| 6,301,584 B1 | 10/2001 | Ranger | |
| 6,301,605 B1 | 10/2001 | Napolitano | |
| 6,301,629 B1 | 10/2001 | Sastri | |
| 6,301,685 B1 | 10/2001 | Shigeta | |
| 6,311,221 B1 | 10/2001 | Raz | |
| 6,314,425 B1 | 11/2001 | Serbinis | |
| 6,321,260 B1 | 11/2001 | Takeuchi | |
| 6,330,561 B1 | 12/2001 | Cohen | |
| 6,339,785 B1 * | 1/2002 | Feigenbaum | H04L 29/06 709/213 |
| 6,343,287 B1 | 1/2002 | Kumar | |
| 6,347,398 B1 | 2/2002 | Parthasarathy | |
| 6,356,946 B1 | 3/2002 | Clegg | |
| 6,369,467 B1 | 4/2002 | Noro | |
| 6,370,686 B1 | 4/2002 | Delo | |
| 6,374,402 B1 | 4/2002 | Schmeidler | |
| 6,385,696 B1 | 5/2002 | Doweck | |
| 6,389,467 B1 | 5/2002 | Eyal | |
| 6,418,554 B1 | 7/2002 | Delo | |
| 6,418,555 B2 | 7/2002 | Mohammed | |
| 6,418,556 B1 | 7/2002 | Bennington | |
| 6,424,991 B1 | 7/2002 | Gish | |
| 6,425,017 B1 | 7/2002 | Dievendorff | |
| 6,449,688 B1 | 9/2002 | Peters | |
| 6,453,334 B1 | 9/2002 | Vinson | |
| 6,457,076 B1 | 9/2002 | Cheng | |
| 6,508,709 B1 | 1/2003 | Karmarkar | |
| 6,510,458 B1 | 1/2003 | Berstis | |
| 6,510,462 B2 | 1/2003 | Blumenau | |
| 6,510,466 B1 | 1/2003 | Cox | |
| 6,524,017 B2 | 2/2003 | Lecocq | |
| 6,530,082 B1 | 3/2003 | Del Sesto | |
| 6,574,618 B2 | 6/2003 | Eylon | |
| 6,584,507 B1 | 6/2003 | Bradley | |
| 6,587,857 B1 | 7/2003 | Carothers | |
| 6,594,682 B2 | 7/2003 | Peterson | |
| 6,598,125 B2 | 7/2003 | Romm | |
| 6,601,103 B1 | 7/2003 | Goldschmidt | |
| 6,601,110 B2 | 7/2003 | Marsland | |
| 6,605,956 B2 | 8/2003 | Farnworth | |
| 6,609,114 B1 | 8/2003 | Gressel | |
| 6,611,812 B2 | 8/2003 | Hurtado | |
| 6,615,166 B1 | 9/2003 | Guheen | |
| 6,622,137 B1 | 9/2003 | Ravid | |
| 6,622,171 B2 | 9/2003 | Gupta | |
| 6,636,961 B1 | 10/2003 | Braun | |
| 6,651,251 B1 | 11/2003 | Shoff | |
| 6,687,745 B1 | 2/2004 | Franco | |
| 6,694,510 B1 | 2/2004 | Willems | |
| 6,697,869 B1 | 2/2004 | Mallart | |
| 6,711,619 B1 | 3/2004 | Chandramohan | |
| 6,732,179 B1 | 5/2004 | Brown | |
| 6,735,601 B1 | 5/2004 | Subrahmanyam | |
| 6,735,631 B1 | 5/2004 | Oehrke | |
| 6,757,708 B1 | 6/2004 | Craig | |
| 6,757,894 B2 | 6/2004 | Eylon | |
| 6,763,370 B1 | 7/2004 | Schmeidler | |
| 6,772,209 B1 | 8/2004 | Chernock | |
| 6,775,779 B1 | 8/2004 | England | |
| 6,779,179 B1 | 8/2004 | Romm | |
| 6,785,768 B2 | 8/2004 | Peters | |
| 6,785,865 B1 | 8/2004 | Cote | |
| 6,801,507 B1 | 10/2004 | Humpleman | |
| 6,810,525 B1 | 10/2004 | Safadi | |
| 6,816,909 B1 | 11/2004 | Chang | |
| 6,816,950 B2 | 11/2004 | Nichols | |
| 6,832,222 B1 | 12/2004 | Zimowski | |
| 6,836,794 B1 | 12/2004 | Lucowsky | |
| 6,854,009 B1 | 2/2005 | Hughes | |
| 6,891,740 B2 | 5/2005 | Williams | |
| 6,918,113 B2 | 7/2005 | Patel | |
| 6,925,495 B2 | 8/2005 | Hedge | |
| 6,938,096 B1 | 8/2005 | Greschler | |
| 6,959,320 B2 | 10/2005 | Shah | |
| 6,970,866 B1 | 11/2005 | Pravetz | |
| 6,985,915 B2 | 1/2006 | Somalwar | |
| 7,010,492 B1 | 3/2006 | Bassett | |
| 7,024,677 B1 | 4/2006 | Snyder | |
| 7,028,305 B2 | 4/2006 | Schaefer | |
| 7,043,524 B2 | 5/2006 | Shah | |
| 7,051,315 B2 | 5/2006 | Artzi | |
| 7,062,567 B2 | 6/2006 | Benitez | |
| 7,093,077 B2 | 8/2006 | Cooksey | |
| 7,096,253 B2 | 8/2006 | Vinson | |
| 7,112,138 B2 | 9/2006 | Hendrick | |
| 7,130,616 B2 | 10/2006 | Janik | |
| 7,137,072 B2 | 11/2006 | Bauer | |
| 7,171,390 B1 | 1/2007 | Song | |
| 7,191,441 B2 | 3/2007 | Abbott | |
| 7,192,352 B2 | 3/2007 | Walker | |
| 7,197,516 B1 | 3/2007 | Hipp | |
| 7,197,570 B2 | 3/2007 | Eylon | |
| 7,246,119 B2 | 7/2007 | Kuwata | |
| 7,451,196 B1 | 11/2008 | de Vries | |
| 7,577,751 B2 | 8/2009 | Vinson | |
| 7,606,924 B2 | 10/2009 | Raz | |
| 7,653,742 B1 | 1/2010 | Bhargava | |
| 7,716,335 B2 | 5/2010 | Dinker | |
| 7,984,332 B2 | 7/2011 | Yang | |
| 8,014,400 B2 | 9/2011 | Zhang | |
| 8,095,678 B2 | 1/2012 | Worrall | |
| 8,166,554 B2 | 4/2012 | John | |
| 8,341,648 B1 | 12/2012 | Cook | |
| 8,510,734 B2 * | 8/2013 | Criddle | G06F 8/60 717/178 |
| 8,831,995 B2 | 9/2014 | Holler | |
| 8,886,790 B2 * | 11/2014 | Harrang | H04L 47/14 709/224 |
| 8,959,183 B2 * | 2/2015 | Zeller | G06F 9/45533 709/219 |
| 8,977,764 B1 | 3/2015 | Ramzan | |
| 9,104,517 B2 * | 8/2015 | Obata | G06F 9/44536 |
| 9,184,916 B2 * | 11/2015 | Pare | H04L 9/065 |
| 9,674,254 B2 * | 6/2017 | Pare | H04L 65/602 |
| 9,716,609 B2 | 7/2017 | de Vries | |
| 9,756,108 B2 | 9/2017 | Jain | |
| 2001/0003828 A1 | 6/2001 | Peterson | |
| 2001/0014878 A1 | 8/2001 | Mitra | |
| 2001/0027493 A1 | 10/2001 | Wallace | |
| 2001/0034736 A1 | 10/2001 | Eylon | |
| 2001/0037399 A1 | 11/2001 | Eylon | |
| 2001/0037400 A1 | 11/2001 | Raz | |
| 2001/0042833 A1 | 11/2001 | Kenway | |
| 2001/0044850 A1 | 11/2001 | Raz | |
| 2001/0044851 A1 | 11/2001 | Rothman | |
| 2002/0015106 A1 | 2/2002 | Taylor, Jr. | |
| 2002/0019864 A1 | 2/2002 | Mayer | |
| 2002/0035674 A1 | 3/2002 | Vetrivelkumaran | |

(56) References Cited

U.S. PATENT DOCUMENTS

| | | |
|---|---|---|
| 2002/0038374 A1 | 3/2002 | Gupta |
| 2002/0042833 A1 | 4/2002 | Hendler |
| 2002/0057893 A1 | 5/2002 | Wood |
| 2002/0059402 A1 | 5/2002 | Belanger |
| 2002/0065848 A1 | 5/2002 | Walker |
| 2002/0078170 A1 | 6/2002 | Brewer |
| 2002/0078203 A1 | 6/2002 | Greschler |
| 2002/0083183 A1 | 6/2002 | Pujare |
| 2002/0083187 A1 | 6/2002 | Sim |
| 2002/0087717 A1 | 7/2002 | Artzi |
| 2002/0087883 A1 | 7/2002 | Wohlgemuth |
| 2002/0087963 A1 | 7/2002 | Eylon |
| 2002/0091763 A1 | 7/2002 | Shah |
| 2002/0091901 A1 | 7/2002 | Romm |
| 2002/0116476 A1 | 8/2002 | Eyal |
| 2002/0133491 A1 | 9/2002 | Sim |
| 2002/0138640 A1 | 9/2002 | Raz |
| 2002/0147849 A1 | 10/2002 | Wong |
| 2002/0156911 A1 | 10/2002 | Croman |
| 2002/0157089 A1 | 10/2002 | Patel |
| 2002/0161908 A1 | 10/2002 | Benitez |
| 2002/0174215 A1 | 11/2002 | Schaefer |
| 2003/0004882 A1 | 1/2003 | Holler |
| 2003/0009538 A1 | 1/2003 | Shah |
| 2003/0056112 A1 | 3/2003 | Vinson |
| 2003/0065917 A1 | 4/2003 | Medvinsky |
| 2003/0088511 A1 | 5/2003 | Karboulonis |
| 2003/0105816 A1 | 6/2003 | Goswami |
| 2003/0138024 A1 | 7/2003 | Williamson |
| 2003/0140160 A1 | 7/2003 | Raz |
| 2003/0187617 A1 | 10/2003 | Murphy |
| 2003/0221099 A1 | 11/2003 | Medvinsky |
| 2004/0036722 A1 | 2/2004 | Warren |
| 2004/0128342 A1 | 7/2004 | Maes |
| 2004/0133657 A1 | 7/2004 | Smith |
| 2004/0199566 A1 | 10/2004 | Carlson |
| 2004/0230784 A1 | 11/2004 | Cohen |
| 2004/0230971 A1 | 11/2004 | Rachman |
| 2004/0267813 A1 | 12/2004 | Rivers-Moore |
| 2004/0268361 A1 | 12/2004 | Schaefer |
| 2005/0010607 A1 | 1/2005 | Parker |
| 2005/0010670 A1 | 1/2005 | Greschler |
| 2005/0091534 A1 | 4/2005 | Nave |
| 2005/0114472 A1 | 5/2005 | Tan |
| 2005/0188079 A1 | 8/2005 | Motsinger |
| 2005/0193139 A1 | 9/2005 | Vinson |
| 2005/0289617 A1 | 12/2005 | Safadi |
| 2006/0010074 A1 | 1/2006 | Zeitsiff |
| 2006/0031165 A1 | 2/2006 | Nave |
| 2006/0047716 A1 | 3/2006 | Keith, Jr. |
| 2006/0048136 A1 | 3/2006 | de Vries |
| 2006/0064673 A1 | 3/2006 | Rogers |
| 2006/0083305 A1 | 4/2006 | Dougherty |
| 2006/0106770 A1 | 5/2006 | de Vries |
| 2006/0120385 A1 | 6/2006 | Atchison |
| 2006/0123185 A1 | 6/2006 | de Vries |
| 2006/0136389 A1 | 6/2006 | Cover |
| 2006/0168294 A1 | 7/2006 | de Vries |
| 2006/0218165 A1 | 9/2006 | de Vries |
| 2006/0230175 A1 | 10/2006 | de Vries |
| 2007/0038642 A1 | 2/2007 | Durgin |
| 2007/0043550 A1 | 2/2007 | Tzruya |
| 2007/0067435 A1 | 3/2007 | Landis |
| 2007/0074223 A1 | 3/2007 | Lescouet |
| 2007/0078988 A1* | 4/2007 | Miloushev ............ G06F 9/5027 709/227 |
| 2007/0126749 A1 | 6/2007 | Tzruya |
| 2007/0129146 A1 | 6/2007 | Tzruya |
| 2007/0129990 A1 | 6/2007 | Tzruya |
| 2007/0130075 A1 | 6/2007 | Song |
| 2007/0130292 A1 | 6/2007 | Tzruyz |
| 2007/0168309 A1 | 7/2007 | Tzruya |
| 2007/0192641 A1 | 8/2007 | Nagendra |
| 2007/0196074 A1 | 8/2007 | Jennings |
| 2007/0256056 A1 | 11/2007 | Stern |
| 2008/0077366 A1 | 3/2008 | Neuse |
| 2008/0155074 A1 | 6/2008 | Bacinschi |
| 2008/0178298 A1 | 7/2008 | Arai |
| 2008/0301316 A1* | 12/2008 | Alpern ............... G06F 9/4843 709/231 |
| 2009/0119458 A1 | 5/2009 | de Vries |
| 2010/0023640 A1 | 1/2010 | Vinson |
| 2013/0132854 A1 | 5/2013 | Raleigh |
| 2013/0304616 A1 | 11/2013 | Raleigh |
| 2014/0040975 A1 | 2/2014 | Raleigh |
| 2014/0250235 A1* | 9/2014 | Bradley ........... H04N 21/26216 709/231 |

FOREIGN PATENT DOCUMENTS

| | | |
|---|---|---|
| EP | 1020824 | 7/2000 |
| EP | 1143349 | 10/2001 |
| WO | 1998040993 | 9/1998 |
| WO | 1998050853 | 11/1998 |
| WO | 1999057863 | 11/1999 |
| WO | 1999060458 | 11/1999 |
| WO | 2000004681 | 1/2000 |
| WO | 2000031657 | 6/2000 |
| WO | 2000031672 | 6/2000 |
| WO | 2000056028 | 9/2000 |
| WO | 2001027805 | 4/2001 |
| WO | 2001046856 | 6/2001 |
| WO | 2002044840 | 6/2002 |
| WO | 2006022745 | 3/2006 |
| WO | 2006047133 | 5/2006 |
| WO | 2006055445 | 5/2006 |
| WO | 2006102532 | 9/2006 |
| WO | 2006102621 | 9/2006 |

OTHER PUBLICATIONS

Bandi, Nagender et al., "Fast Data Stream Algorithms using Associative Memories," Proceedings of the 2007 ACM SIGMOD International Conference on Management of Data, pp. 247-256, Jun. 12, 2007.

Boneh, Dan et al., "An Attack on RSA Given a Small Fraction of the Private Key Bits," Advances in Cryptology—ASIACRYPT '98, Lecture Notes in Computer Science, vol. 1514, pp. 25-34, Oct. 1998 [retrieved online at http://download.springer.com/static/pdf/450/chp%253A10.1007%252F3-540-49649-1_3.pdf?auth66=1394831295_318c7a44939193b5a2aff612b2a047ac&ext=.pdf].

Brin, Sergey et al., "The Anatomy of a Large-Scale Hypertextual Web Search Engine," Proceedings of the Seventh International World Wide Web Conference, pp. 107-117, Apr. 1998 [retrieved online at http://ilpubs.stanford.edu:8090/361/1/1998-8.pdf].

Chu, Yang-Hua et al., "Referee: Trust Management for Web Applications," Proceedings of the Sixth International World Wide Web Conference, 1997, retrieved online on Jun. 15, 2006 at http://www.si.umich.edu/~presnick/papers/Referee/www6-referee.html.

Faupel, Matthew, "Status of Industry Work on Signed Mobile Code," Joint European Networking Conference (JENC), May 1997, 313-1-313-8.

Fiedler, David et al., "UNIX System V. Release 4 Administration," Second Edition, 1991, 1-13, 37-116, 152-153, 175-200, 291-312, Hayden Books, Carmel, Indiana, USA.

George, Binto et al., "Secure Transaction Processing in Firm Real-Time Database Systems," SIGMOD International Conference on Management of Data 1997, 462-473, V26, Issue 2, Association of Computing Machinery (ACM) Press, Tucson, Arizona, United States, May 13, 1997.

Gralla, Preston, "How the Internet Works: Chapter 44—Shopping on the Internet," IEEE Personal Communications, Aug. 1999, 260-67, QUE—A division of Macmillan Computer Publishing, Millennium Edition.

Microsoft Corp., "Computer Dictionary," 3rd edition, 1997, pp. 119 & 305, Microsoft Press.

Microsoft Corp., "Understanding Universal Plug and Play," pp. 1-39, Feb. 2000.

(56) References Cited

OTHER PUBLICATIONS

Morrow, Brian et al., "Indexing Within—The Lost Gold Within the Enterprise" Endeavors Technology, Aug. 22, 2000, pp. 1-6.

Mullender, Sape J. et al., "Amoeba: A Distributed Operating System for the 1990's," Computer Magazine, May 1990, 44-53, 23(5).

Nakayoshi et al., "A Secure Private File System with Minimal System Administration," Communications, Computers and Signal Processing, 1997 IEEE Pacific Rim Conference, 251-255, vol. 1.

O'Mahony, Donal, "Security Considerations in a Network Management Environment," 1994, 12-17, vol. 8, IEEE, USA.

Pyarali, Irfan et al., "Design and Performance of an Object-Oriented Framework for High-Speed Electronic Medical Imaging," Fall 1996, Computing Systems Journal, 331-375, vol. 9, http://www.cs.wustl.edu/~schmidt/PDF/COOTS-96.pdf.

Rappaport, Avi, "Robots & Spiders & Crawlers: How Web and Intranet Search Engines Follow Links to Build Indexes," Infoseek Software, pp. 1-38 (Oct. 1999).

Reinhardt, Robert B., "An Architectural Overview of UNIX Network Security," ARINC Research Corporation, Sep. 19, 1992, retrieved online on Jun. 15, 2006 at http://www.clusit.it/whitepapers/unixnet.pdf.

Sirbu, Marvin et al., "Netbill: An Internet Commerce System Optimized for Network-Delivered Services," IEEE Personal Communications, 2(4):34-39, Aug. 1995.

Srivastava, Utkarsh et al., "Flexible Time Management in Data Stream Systems," Proceedings of the Twenty-Third ACM SIGMOD-SIGACT-SIGART Symposium on Principles of Database Systems (PODS '04), pp. 263-274, Jun. 2004.

Tardo, Joseph et al., "Mobile Agent Security and Telescript," 4th International Conference of the IEEE Computer Society (IEEE CompCon1996), Feb. 1996.

International Application No. PCT/US2004/028195, Search Report and Written Opinion dated May 2, 2006.

International Application No. PCT/US2005/041024, Search Report and Written Opinion dated Feb. 27, 2007.

International Application No. PCT/US2006/010637, Search Report and Written Opinion dated Sep. 25, 2007.

International Application No. PCT/US2006/010904, Search Report and Written Opinion dated Dec. 26, 2007.

U.S. Appl. No. 09/996,180, filed Nov. 27, 2001.

\* cited by examiner

1300

| block | session | | | | | | | | | |
|---|---|---|---|---|---|---|---|---|---|---|
| | 1 | 2 | 3 | 4 | 5 | 6 | 7 | 8 | 9 | 10 |
| 1 | 0 | 0 | 1 | 0 | 1 | 1 | 0 | 1 | 0 | 1 |
| 2 | 1 | 0 | 0 | 1 | 0 | 1 | 0 | 1 | 0 | 1 |
| 3 | 0 | 1 | 1 | 1 | 0 | 1 | 1 | 1 | 1 | 0 |
| 4 | 1 | 0 | 1 | 0 | 0 | 0 | 1 | 1 | 0 | 0 |
| 5 | 0 | 1 | 0 | 1 | 0 | 0 | 1 | 1 | 1 | 1 |
| 6 | 0 | 1 | 1 | 1 | 1 | 0 | 0 | 0 | 0 | 1 |
| 7 | 1 | 0 | 1 | 0 | 1 | 1 | 0 | 0 | 0 | 1 |
| 8 | 1 | 1 | 1 | 0 | 1 | 1 | 0 | 1 | 0 | 0 |
| 9 | 0 | 1 | 1 | 0 | 0 | 1 | 0 | 1 | 0 | 0 |
| 10 | 1 | 0 | 0 | 1 | 1 | 0 | 1 | 1 | 1 | 0 |

DERIVING COMPONENT STATISTICS FOR A STREAM ENABLED APPLICATION

CROSS REFERENCE TO RELATED APPLICATIONS

This application is a continuation of U.S. patent application Ser. No. 15/133,730 filed Apr. 20, 2016, now U.S. Pat. No. 10,445,210, which is a continuation of U.S. patent application Ser. No. 14/499,619 filed Sep. 29, 2014, now U.S. Pat. No. 9,436,578, which is a continuation of U.S. patent application Ser. No. 12/062,766 filed Apr. 4, 2008, now U.S. Pat. No. 8,892,738, which claims the benefit of U.S. Provisional Patent Application Ser. No. 60/986,260 filed Nov. 7, 2007, all of which are incorporated herein by reference.

BACKGROUND

A software application may include various functionality. Persons designing software may be confronted with a limited knowledge of their users. Developing functionality for software applications for users without understanding the ways in which users use software inhibits development. Developers wonder: Is certain functionality used? How popular is the functionality?

The foregoing examples of the related art and limitations related therewith are intended to be illustrative and not exclusive. Other limitations of the related art will become apparent to those of skill in the art upon a reading of the specification and a study of the drawings.

SUMMARY

The following examples and aspects thereof are described and illustrated in conjunction with systems, tools, and methods that are meant to be exemplary and illustrative, not limiting in scope. In various examples, one or more of the above described problems have been reduced or eliminated, while other examples are directed to other improvements.

A technique for determining component statistics may include associating blocks with components. A component in a block may begin at a block offset and have a length. A component included in multiple blocks may have multiple block offsets and lengths. A component may be identified within a block. In addition, for example, it may be desirable to analyze statistics to determine component popularity.

A method based on the technique may include associating a component with a block, receiving a log of requests for blocks, and providing the association of the component with one or more requests for the block from the log.

BRIEF DESCRIPTION OF THE DRAWINGS

FIG. 13 depicts a diagram of an example of a block-session grid indicating requests for blocks during sessions.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
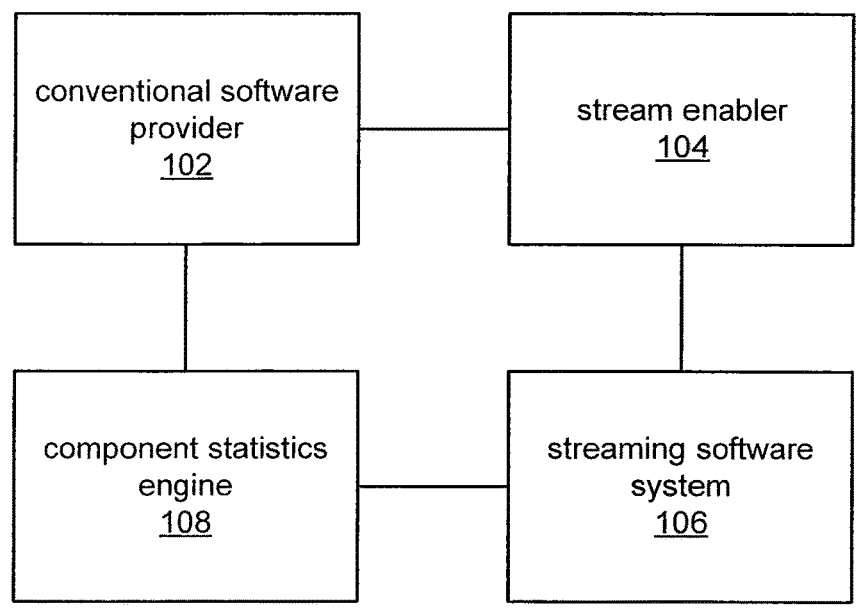
FIG. 1 depicts a diagram of an example of a system for determining component statistics.

FIG. 1 depicts a diagram of an example of a system 100 for determining component statistics. The system 100 includes conventional software provider 102, stream enabler 104, component statistics engine 108, and streaming software system 106. The parts portrayed in this figure can be arbitrarily combined or divided into separate software, firmware, and/or hardware components. Such components, regardless of how they are combined or divided, can execute on the same computing device or multiple computing devices. The multiple computing devices may be connected by one or more networks.

In the example of FIG. 1, conventional software provider 102 provides deliverables such as data, executable code, and libraries. Providing may be by way of download over a network, from an input/output (I/O) device, or via any known or convenient mechanism.

A component of a conventionally coded software application may be a part of a deliverable file. The deliverable file may have a filename. A component may be identified by a tuple including a filename, an offset, and a length. A component may be equivalent to a deliverable file, or may include only a portion of a deliverable file. An application may be made up of one or more components. In a non-limiting example, a component may include executable code, game level data, phone number data, or any other data that may be stored in a file.

A feature may include one or more components, one or more features, or any combination of zero or more components and zero or more features. A feature defined in terms of components and other features may be reduced to a list of unique components by merging, without duplication, the components of the other features. In a non-limiting example a first feature may include the components that compose the English spell checking module; a second feature may include the components that compose the Spanish spell checking module; while a third feature may include the first and second features.

In the example of FIG. 1, the conventional software provider 102 may maintain link maps. A link map associates features with files, offsets, and lengths. Each file, offset, and length may correspond to a component. A link map may be used to associate features with components. In a non-limiting example, function names are associated with files, offsets, and lengths in a conventional link map.

Some features could be identified using a link map interpreting tool that locates components. In a non-limiting example, the tool may take a file including a description of levels of a game; the tool may provide information to identify the locations in files of components included in the features.

In the example of FIG. 1, the stream enabler 104 receives non-stream-enabled deliverables associated with an application and breaks the deliverables into blocks. The stream enabler 104 may or may not associate files with blocks, block offsets and lengths and create block associations. This association may be stored in a file for subsequent use. The stream enabler 104 may also convert the deliverables into a stream-enabled application for use with a streaming software system.

In the example of FIG. 1, the streaming software system 106 may be one or more computing devices. The one or more computing devices receive the stream-enabled application and execute the stream-enabled application. The stream-enabled application may or may not be an executable. It may be possible for the stream-enabled application to be a single executable including the entire stream-enabled application. It may also be possible for the stream-enabled application to be only data, having no executable content.

In the example of FIG. 1, the streaming software system 106 may collect block statistics, such as by logging block usage as discussed later with reference to FIGS. 7-9.

In the example of FIG. 1, the component statistics engine 108 may or may not receive feature associations from the conventional software provider 102, block associations from the stream enabler 104, and/or log information or block statistics from the streaming software system 106.

An engine typically includes a processor and memory. The memory may include instructions for execution by the processor. The memory may include random access memory (RAM), non-volatile (NV) storage, or any other known or convenient mechanism for storing data.

In the example of FIG. 1, the component statistics engine 108 may use block associations to create statistics. In a non-limiting example, component statistics engine 108 receives a set of blocks requested during sessions and a map file associating components with blocks. Component statistics engine generates reports of components most frequently requested. These reports can be used by a party, such as a person associated with the conventional software provider 102, by way of example, but not limitation, estimate the popularity of a particular component.

Figure 2:
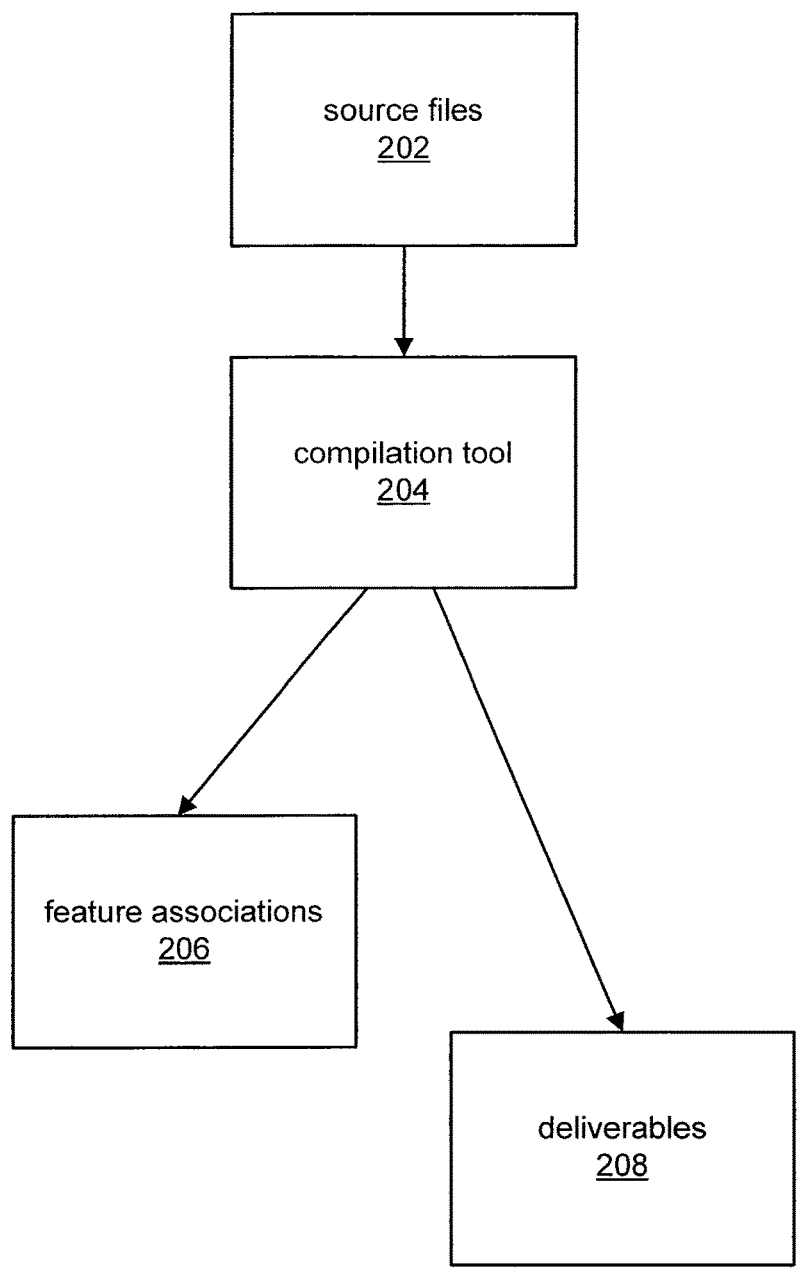
FIG. 2 depicts a diagram of an example of a conventional software provider producing deliverables such as software and data from source files.

FIG. 2 depicts a diagram 200 of an example of a conventional software provider producing deliverables from source files. The diagram 200 includes source files 202, compilation tool 204, feature associations 206, and deliverables 208.

In the example of FIG. 2, sources files 202 could be conventional source files, code, specifications for products, specifications of game levels, or any description of data that could be processed and or compiled into a file. A variety of programming languages, scripting languages, and descriptive languages could be used to prepare source files. Collections of files organized as a project could be source files. In a non-limiting example, a source file is a high level description of a function written in the C++ programming language. Another non-limiting example of a source file is a data file prepared for interpretation by an interpreter.

In the example of FIG. 2, compilation tool 204 could be a conventional compiler or any other tool that could take a source file and produces, for example, a deliverable file. The compilation tool 204 could be a low level assembler, or a high level compiler for languages. The compilation tool 204 could be an interpreter. In a non-limiting example, the compilation tool 204 operates with the Java programming language. In another non-limiting example, the compilation tool 204 operates with an assembly language.

In the example of FIG. 2, feature associations file 206 associate components with deliverables, offsets and lengths. In a non-limiting example, a particular component of a word processing program could be a spell-checker. The spell-checker could be associated with components and identified in files at particular offsets and having particular lengths. A particular feature could be spread across multiple files, in which case multiple files, offsets and lengths could be included in the feature associations to associate the feature with the file(s).

The feature associations file 206 could be created using link maps. Link maps may enable finer component analysis. With the link map it may be possible to locate functions, and components that are not readily identifiable from analysis of the deliverables. In some cases at least some of the information in a link map may be ascertainable through analysis of a software application. In a non-limiting example, a component can be associated with file "foo.dll," offset 1000, length 128 Kb. Feature associations 206 would include an entry associating the component with file foo.dll at offset 1000, length 128K.

In the example of FIG. 2, deliverables 208 may include a variety of different components including any file necessary to support the application. In a non-limiting example, deliverables 208 could be executable files, library files, and data files. These files are typically delivered to a consumer via a CD, DVD, downloadable media, or other software delivery mechanism. The deliverables may or may not include an installer program that can be used to install the software on an end user's computing device.

In the example of FIG. 2, in operation, compilation tool 204 may produce feature associations 206 and deliverables 208 from source files 202. Compilation of source files 202 may involve translating a source file language into a target language. The deliverables 208 may be generated by translating. The feature associations 206 may be generated while translating. A function or other component of interest may be compiled into one or more files, at offsets and lengths. A link map may be generated. In a non-limiting example, machine code, a lower level language, is generated from code written in a high level programming language, Java.

Figure 3:
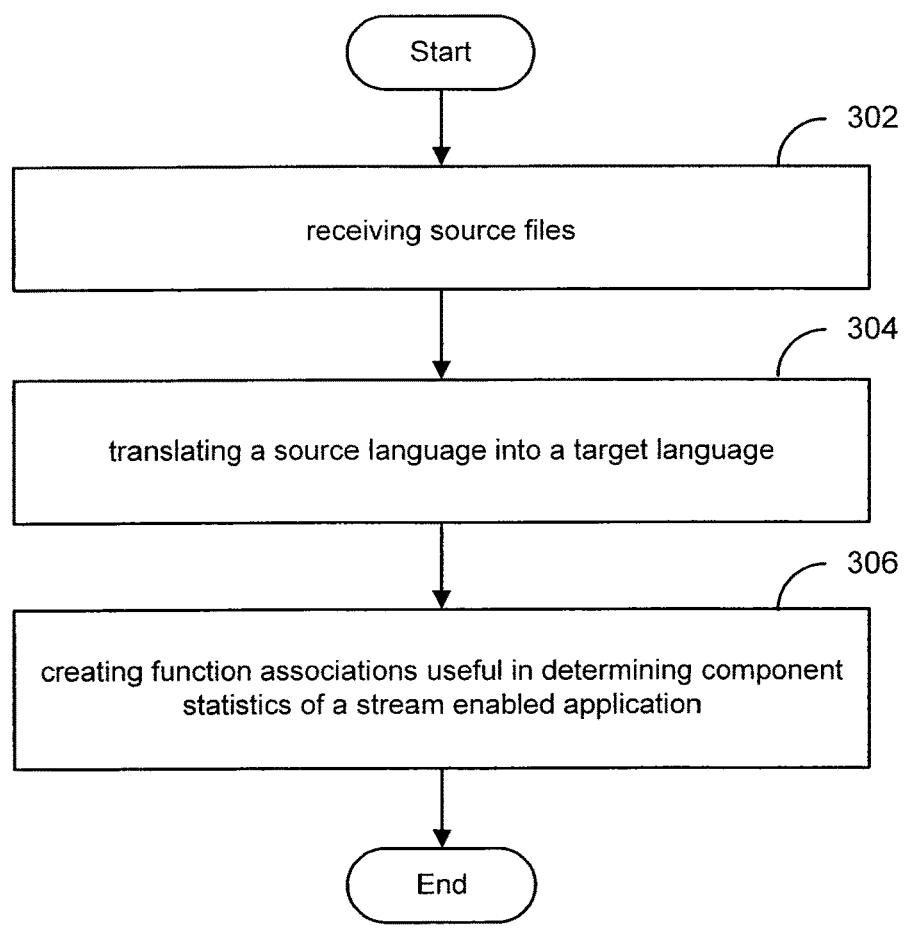
FIG. 3 depicts a flowchart of an example of a method for creating feature associations.

FIG. 3 depicts a flowchart 300 of an example of a method for creating feature associations. The method is organized as a sequence of modules in the flowchart 300. However, it should be understood that these and modules associated with other methods described herein may be reordered for parallel execution or into different sequences of modules.

In the example of FIG. 3, the flowchart 300 starts at module 302 with receiving source files. Source files could be received by an interface, such as on a CD-ROM, a DVD-ROM, or via a downloadable file. Source files may be created, stored locally, and received from a local memory. A compilation tool may receive source files.

In the example of FIG. 3, the flowchart 300 continues to module 304 with translating a source language into a target language. A source language may be a high level descriptive language or a low level descriptive language. A file encoding could be a source language. A target language include binary code, object code, executable code, non-executable code, interpreted file encoding, or and any other target language known or convenient.

In the example of FIG. 3, the flowchart 300 continues to module 306 with creating feature associations useful in determining component statistics of a stream-enabled application. Feature associations could include link maps and may also include associations not found in a link map such as associations between functional and non-functional components of an application. In a non-limiting example, a data component may be associated with an executable component where each is part of an image searching function. A particular feature could include multiple components and the multiple components could be spread across multiple files. Feature associations may identify the components and the data as part of a feature. Feature associations may allow for analysis of features associated with multiple components. Having created feature associations useful in determining component statistics of a stream-enabled application, the flowchart terminates.

Figure 4:
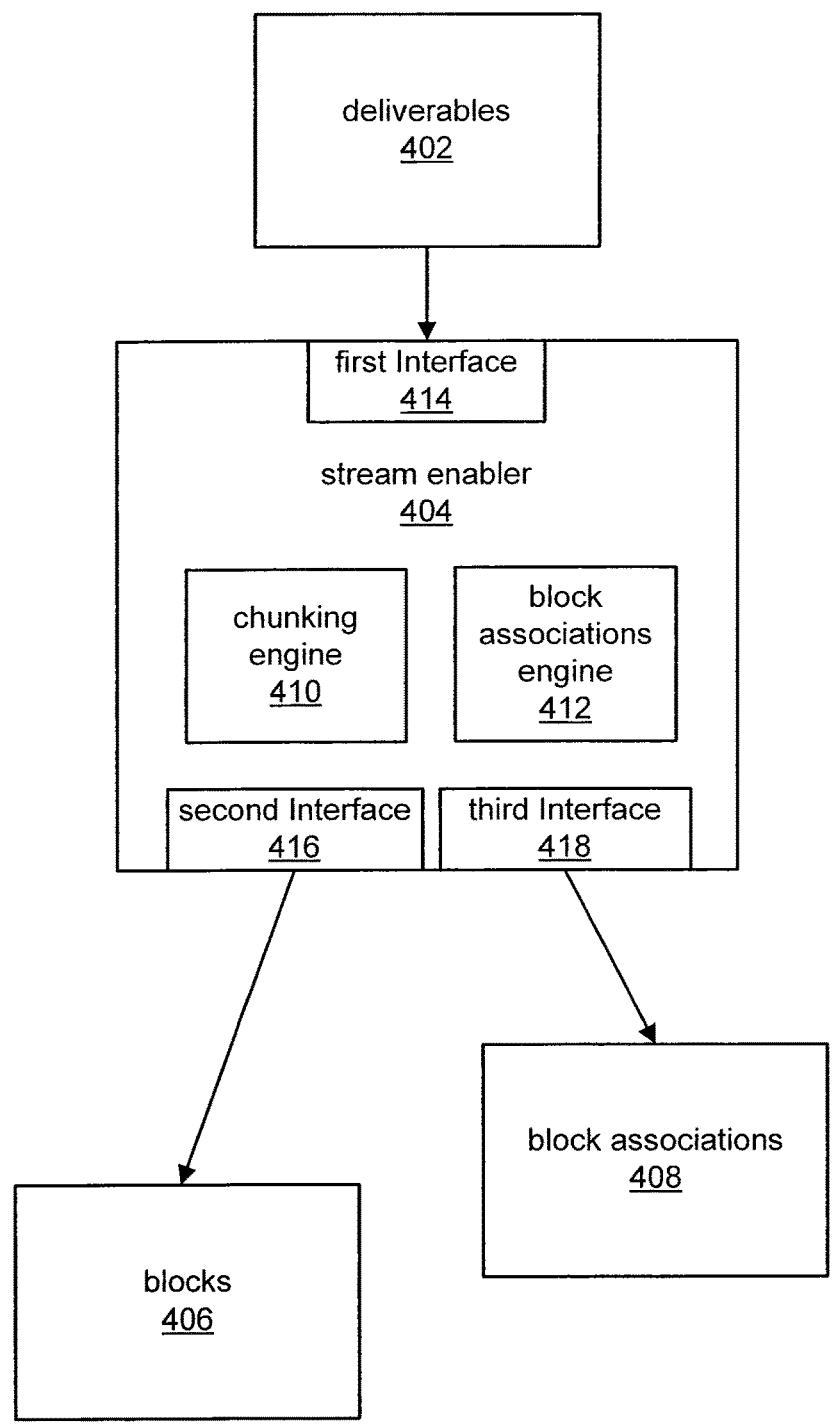
FIG. 4 depicts a diagram of an example of a stream enabler breaking deliverables into blocks and creating block associations.

FIG. 4 depicts a diagram 400 of an example of a stream enabler breaking deliverables into blocks and creating block associations. The diagram 400 includes deliverables 402, stream enabler 404, blocks 406, and block associations 408.

In the example of FIG. 4, deliverables 402 may be executable files, library files, data files, and any other files required to support an application. The deliverables 402 collectively may be one or more conventionally coded software applications designed for execution on a conventional computing device. Deliverables may be included on one or more disks, CD-ROMs, DVD-ROMs, or in one or more downloadable files. An installer may be included in deliverables 402 to install deliverables 402 on to a conventional computing device.

In the example of FIG. 4, stream enabler 404 includes chunking engine 410, block associations engine 412, first interface 414, second interface 416, and third interface 418. Stream enabler 404 may include a processor and memory. Memory may include random access memory (RAM), non-volatile (NV) storage, or any storage medium known or convenient. In the example of FIG. 4, first interface 414, second interface 416, and third interface 418 could be a single interface capable of both input and output.

In the example of FIG. 4, chunking engine 410 may include a module for reading deliverables into a memory and writing out blocks of an optimal block size. Locations for reading deliverables and writing blocks may be specified. Rules for determining an optimal block size may be specified. An optimal block size may be specified. In a non-limiting example, the value may be in bytes, bits or other size known or convenient. Instructions for operation may be provided prior to or concurrent with operation.

In the example of FIG. 4, block association engine 412 may include a module for associating a deliverable file, offset and length, with a block. A module for producing a file containing block associations may be specified. A format for the file including the block associations may be specified.

In the example of FIG. 4, the blocks 406 may include one or more blocks associated with a stream-enabled application. The blocks 406 may include an executable file associated with executing the stream-enabled application. One or more blocks of the blocks 406 may include components stored in various blocks at various offsets and lengths.

In the example of FIG. 4, the block associations 408 associate blocks with files, offsets and lengths. A block association may include a block identifier and a deliverable filename, offset, and length. Block associations 408 may include each file, offset and length for a plurality of blocks and a plurality of deliverables. In a non-limiting example, a deliverable is a file, foo.exe, and foo.exe is broken into three blocks, block A, block B, and block C; a block association is created associating blocks A, B, and C with foo.exe where each block has a specific offset and length.

In the example of FIG. 4, block associations 408 may be related with feature associations to identify components. In a non-limiting example, a feature may be identified as corresponding to blocks 27, 28, 29, and 30. Component utilization through requests for blocks 27, 28, 29, and 30 may thus be used to determine statistics for the feature.

In the example of FIG. 4, in operation, stream enabler 404 receives deliverables 402 through first interface 414, and chunking engine 410 breaks deliverables 402 into blocks 406. If a deliverable is smaller than the optimal block size it is theoretically possible for the stream enabler 404 to create a single block including the deliverable. Concurrently, block associations engine 412 creates block associations 408 identifying blocks with deliverables.

Figure 5:
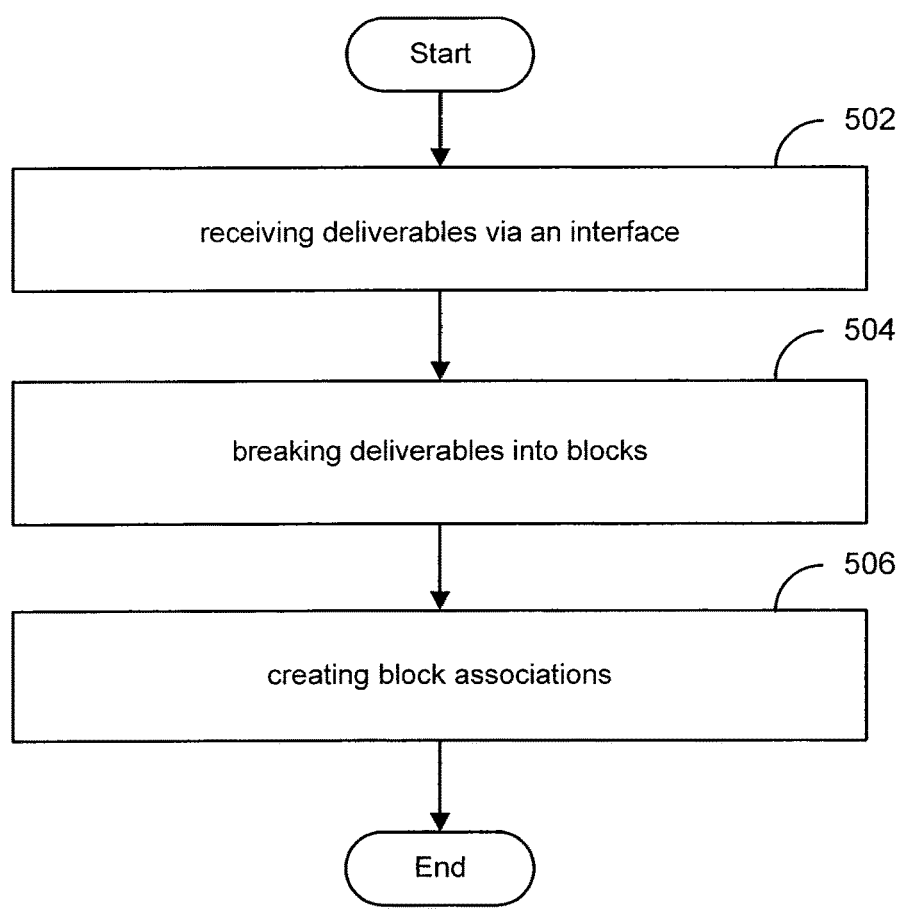
FIG. 5 depicts a flowchart of an example of a method for creating blocks and block associations.

FIG. 5 depicts a flowchart 500 of an example of a method for creating blocks and block associations. The method is organized as a sequence of modules in the flowchart 500. However, it should be understood that these and modules associated with other methods described herein may be reordered for parallel execution or into different sequences of modules.

In the example of FIG. 5, the flowchart 500 starts at module 502 with receiving deliverables via an interface. The interface may receive deliverables via one or more disks, CD-ROMs, DVD-ROMs, one or more downloadable files, or any manner known or convenient.

In the example of FIG. 5, the flowchart 500 continues to module 504 with breaking deliverables into blocks. A stream enabler may break a deliverable into blocks. If a deliverable is smaller than the optimal block size it is theoretically possible for a stream enabler to create a single block. However, deliverables may be broken into many blocks. An optimal block size may be used to break deliverables into blocks.

In the example of FIG. 5, the flowchart 500 continues to module 506 with creating block associations. A block association may include a block identifier and a deliverable filename, offset, and length. Block associations may include a file and a plurality of blocks associated with the file. Block associations may be created while a stream enabler breaks deliverables into blocks. Having created block associations, the flowchart terminates.

Figure 6:
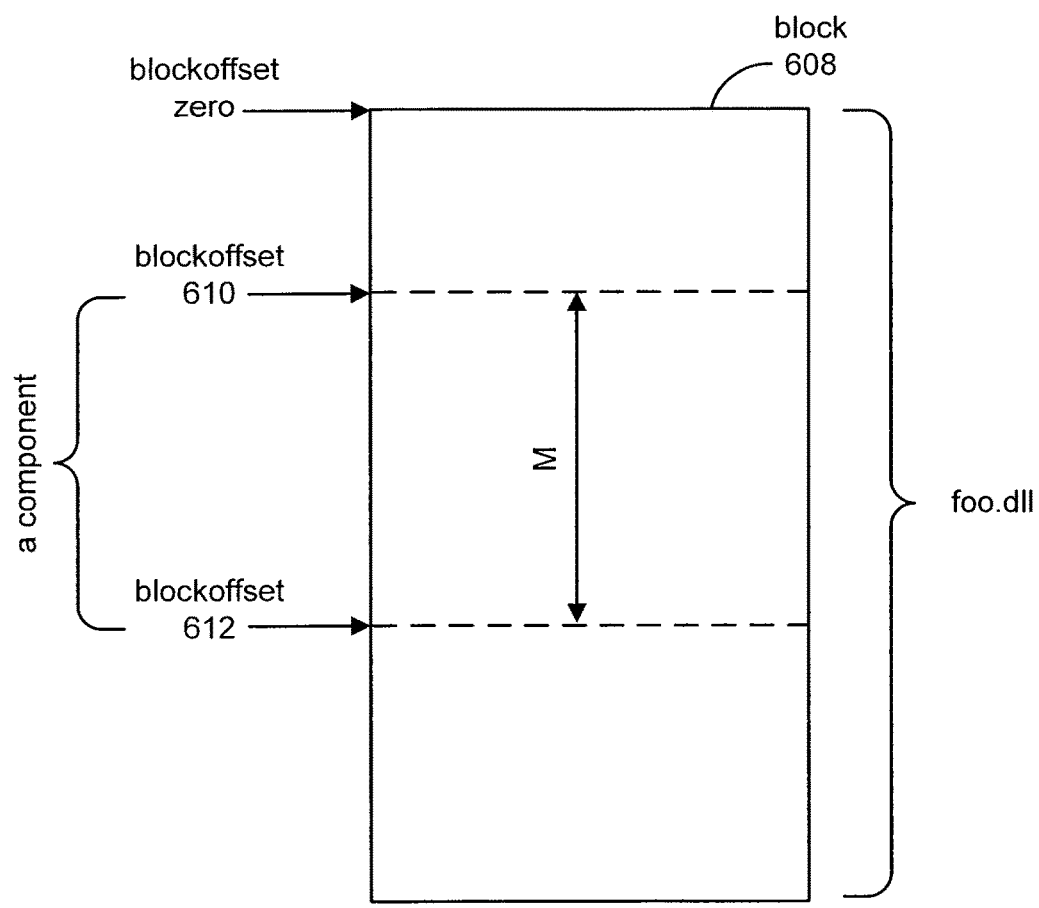
FIG. 6 depicts a diagram of an example of a block with a component located in a portion of the block.

FIG. 6 depicts a diagram 600 of an example of a component located in part of a block. M may be measured in any known or convenient manner, e.g., bits or bytes. Diagram 600 includes block 608, block offset 610, and block offset 612. In a non-limiting example, the block 608 includes a part of a file foo.dll and a component starting at block offset 610, and having length M includes a function for which analysis is desirable.

Figure 7:
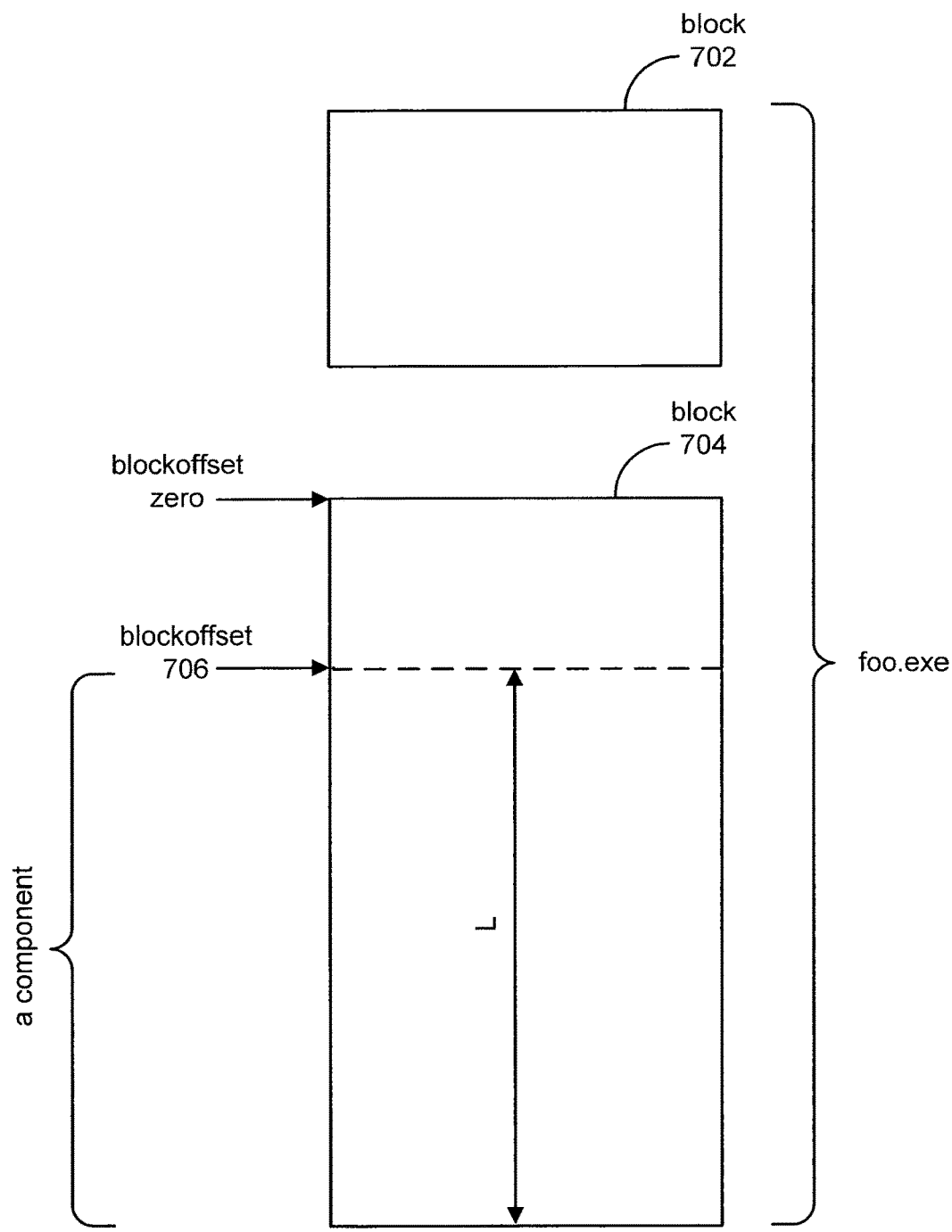
FIG. 7 depicts a diagram of an example of two blocks associated with a deliverable, the second block including a component.

FIG. 7 depicts a diagram 700 of an example of a deliverable broken into two blocks, the second block including a component. The diagram 700 includes block 702, block 704, and block offset 706. Foo.exe is an example of a deliverable that has been broken into multiple blocks including block 702 and block 704. For the purpose of this example only, foo.exe spans block 702 and block 704. However, features could span portions of a plurality of not-necessarily-sequential blocks. A component of the deliverable is stored in a part of block 704. The component begins at block offset 706, and spans length L. Accessing a portion of the component might require, for example, requesting block 704, blockoffset 706, length 512 bytes.

Figure 8:
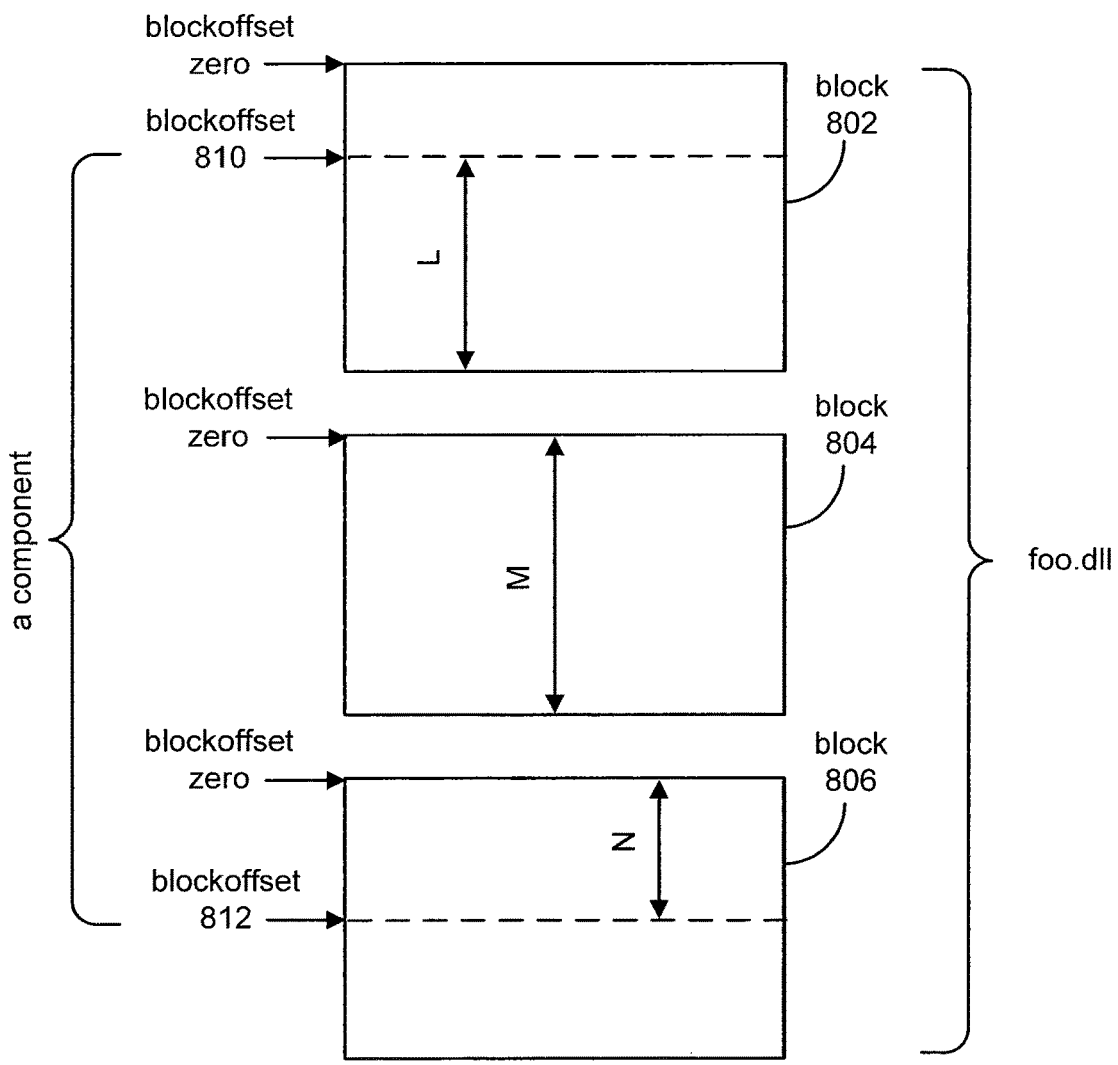
FIG. 8 depicts a diagram of an example of multiple blocks with a component spanning the multiple blocks.

FIG. 8 depicts a diagram 800 of an example of a component spanning multiple blocks. FIG. 8 includes block 802, block 804, block 806, block offset 810, and block offset 812. A stream enabler may break a deliverable file into multiple blocks. As a result, a component included in the deliverable file identified by a file, offset, and length may be included in multiple blocks when the deliverable is broken into multiple blocks. Accessing a part of the component may include a request to a part of block 802, a part of block 804, or a part of block 806. Creating statistics of the component's usage may require tracking requests for the multiple blocks. A first sub-component begins at block 802 offset 810 and spans length L. The component continues with a second sub-component at block 804, offset zero, and spans length M, all of block 804. The component continues with a third sub-component that begins at block 806, offset zero, and spans length N.

Figure 9:
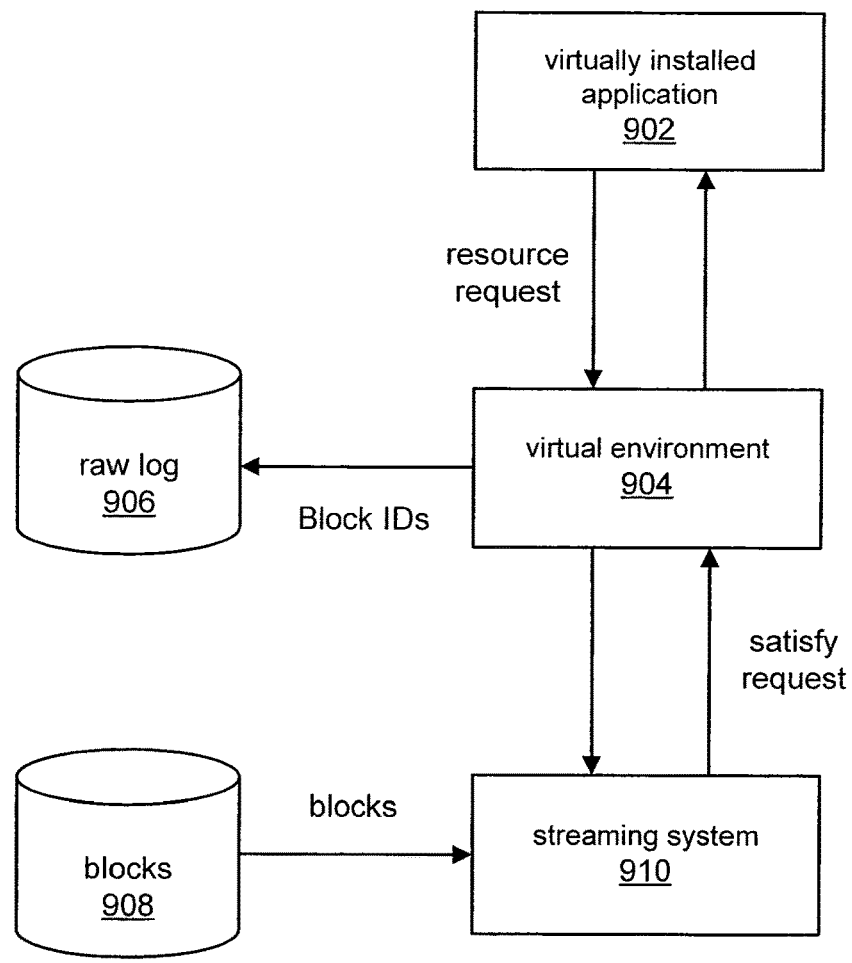
FIG. 9 depicts a diagram of an example of a streaming system logging block requests.

FIG. 9 depicts a diagram 900 of an example of a streaming system logging block requests. The diagram 900 includes virtually installed application 902, virtual environment 904, raw log 906, blocks 908, and streaming system 910.

In the example of FIG. 9, the virtually installed application 902 is an instance of a program that has been stream-enabled. The virtually installed application can operate as though it has access to local components at particular offsets and lengths. A conventional OS may be made available to virtually installed application 902, and virtually installed application may execute as though it is executing on the conventional OS.

In the example of FIG. 9, virtual environment 904 enables a streamed application to execute on a computing device in a virtualized execution environment. An example of a virtualized execution environment is discussed in U.S. patent application Ser. No. 09/098,095 entitled "METHOD AND APPARATUS TO ALLOW REMOTELY LOCATED COMPUTER PROGRAMS AND/OR DATA TO BE ACCESSED ON A LOCAL COMPUTER IN A SECURE, TIME-LIMITED MANNER, WITH PERSISTENT CACHING," which is incorporated by reference. The virtual environment 904 may include an agent process associated with virtually installed application, and capable of requesting blocks. The virtual environment 904 may include an agent process associated with logging.

In the example of FIG. 9, raw log 906 includes zero or more entries, an entry including a unique session identifier and zero or more block IDs. If the raw log does not include any entries, it may be referred to as an empty log. A plurality of entries may be maintained. It may be desirable to store raw log 906 as a database. Any known or convenient implementation of a database may be used. It should be noted that the term "database" is intended to be afforded a meaning broad enough to include a log file or a data dump.

In some cases it may be desirable to maintain raw log 906 in a format. Any format known or convenient may be used, and raw log 906 could be unformatted, as well. It should be noted that, as used herein, a "formatted log" is normally referred to in association with a log processed from the raw log. In this context, the raw log, regardless of format, would not be referred to as a "formatted log."

In the example of FIG. 9, blocks 908 may include one or more blocks of a stream-enabled application. Deliverables of a conventionally coded application may be broken into the blocks 908 during stream-enablement. The blocks 908 may include one or more components of the stream-enabled application.

In the example of FIG. 9, streaming system 910 may include one or more computing devices. Streaming system 910 may include a server and a streaming playback device. A streaming playback device may be any computing device for executing a stream-enabled application, and would typically include the virtual environment 904. Streaming system 910 may be a stand alone device executing a stream-enabled application.

The agent process associated with logging may have an associated delta transmission protocol. In a delta transmission protocol, the agent process remembers identifiers (ID)s of blocks that have already been transmitted and only sends the block IDs of blocks not previously transmitted. Advantageously, with a delta transmission protocol, block IDs are not normally redundantly retransmitted.

In the example of FIG. 9, in operation, a virtually installed application executes and receives a unique session identifier. If the streamed application is being executed multiple times in the virtual environment 904 each instance may receive a unique session identifier. If a streamed application is run concurrently in multiple environments, each instance may receive a unique session identifier. While executing, the virtually installed application 902 makes a resource request to virtual environment 904. The virtually installed application 902 operates as though it is opening and reading resources from local components at particular offsets and lengths. The virtualized environment 904 receives the request instead. The resource request is ultimately translated into a list including one or more blocks. Block IDs of the one or more blocks are provided to raw log 906. The agent process of the virtual environment may buffer the IDs of blocks that have been requested. The agent process may then transmit the buffer to subsequent logging processes that ultimately provide block IDs to raw log 906. An agent process may choose to use a delta transmission protocol. The block request may be provided to streaming system 910 which, if necessary, requests the blocks included in the list. Streaming system 910 receives the blocks. A subset of block data of the one or more blocks may then be delivered to the virtualized environment 904. Virtualized environment 904 may then provide the subset of block data as resources to virtually installed application 902 to satisfy the resource request.

In the example of FIG. 9, in operation, caching may occur in one or more places. For example, the virtual environment 904 may maintain a cache for requested resources. If the virtual environment receives a request for a resource, it may provide a block ID associated with the resource to the raw log 906 so that the number of requests for resources is recorded even if the actual block request is not sent to the streaming system 910. Then the virtual environment 904 may, depending upon the implementation, either provide the resource to the virtually installed application 902, or request the resource from the streaming system 910, which satisfies the request. It may be noted that not all virtual environments 904 will necessarily include a cache.

As another example, the streaming system 910 may maintain a cache of recently used blocks and may satisfy block requests from the cache. Streaming system 910 may or may not record block requests regardless of whether the requests are satisfied from the cache. If the raw log 906 is implemented to include substantially all resource requests, some block request logging might be redundant. Block access statistics may be generated from the block request log (not shown) of the streaming system 910 and/or from the raw log 906.

In a non-limiting example, an operating system (OS) may maintain a cache of recently used pages. If a request from a stream-enabled application can be satisfied from an OS's virtual machine (VM) cache, the OS may satisfy the request from the VM cache. An initial request may be logged, but subsequent requests to the cached blocks may be invisible the streaming system, and thus, may or may not be used to generate block frequency statistics.

In one implementation, a streaming playback device is remotely coupled to a server. The server may include the blocks 908. One or more block-caching servers might exist between the streaming playback device and the server. Such block-caching servers may provide a block to the playback device without a request reaching the server. In another implementation, a streaming playback device is coupled to an I/O device that includes the block 908. In this case, the playback device may be described as streaming from a peripheral device. In any case, the streaming system 910 may be treated in most requests as an OS or kernel of the playback device.

Figure 10:
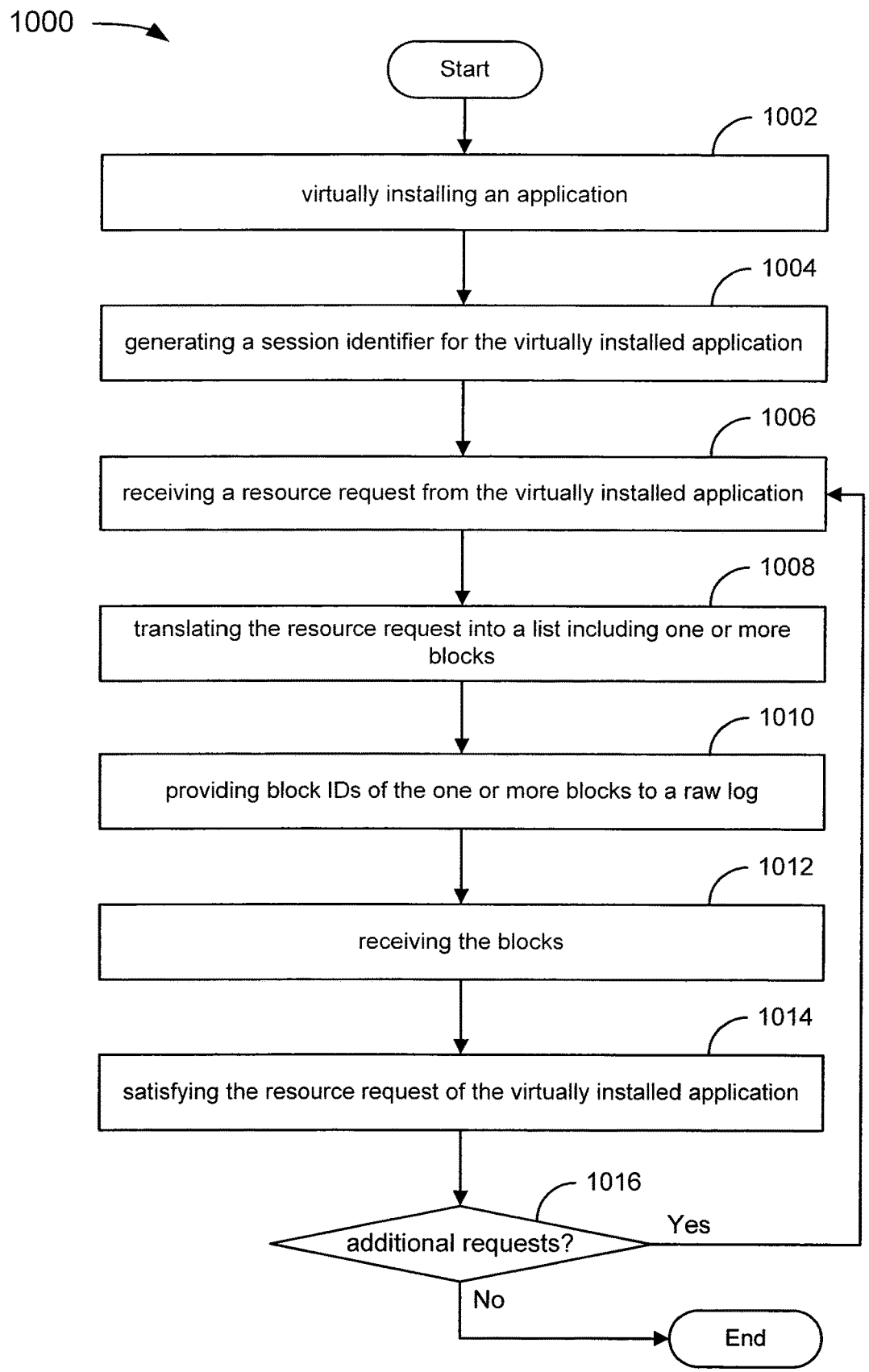
FIG. 10 depicts a flowchart of an example of a method for logging block requests.

FIG. 10 depicts a flowchart 1000 of an example of a method for logging block requests. The method is organized as a sequence of modules in the flowchart 1000. However, it should be understood that these and modules associated with other methods described herein may be reordered for parallel execution or into different sequences of modules.

In the example of FIG. 10, the flowchart 1000 starts at module 1002 with virtually installing an application. Virtually installing an application may include instantiating an instance of the application within a virtualized environment. Virtually installing an application may or may not require a prior installation of a virtualized environment. Blocks that include data necessary to fully utilize the virtual application may be transferred, either in advance or upon request, to a computing device for execution of the virtually installed application.

In the example of FIG. 10, the flowchart 1000 continues to module 1004 with generating a session identifier for the virtually installed application. If the virtually installed application is being executed multiple times, each instance may receive a unique session identifier. If the virtually installed application is run concurrently in multiple virtual environments, each instance may receive a unique session identifier. It may be desirable to generate a unique session identifier, which can be maintained to identify the session and virtually installed application without confusing the application with other sessions, other instances of the application, other versions of the application, or other applications. The session identifier may be used by the virtually installed application to identify itself as a source of a request for blocks and the destination for the blocks so that the request may be logged.

In the example of FIG. 10, the flowchart 1000 continues to module 1006 with receiving a resource request from the virtually installed application. A virtualized environment may receive the resource request. A virtually installed application may operate as though it is opening and reading resources from local components at particular offsets and lengths, and may request resources as though it is executing locally.

In the example of FIG. 10, the flowchart 1000 continues to module 1008 with translating the resource request into a list including one or more blocks. The resource request may be translated into a list including one or more blocks. The blocks may include resources relevant to the request from the virtual application. In one implementation, the virtual environment may add resources the virtual environment believes will be requested soon by the virtually installed application.

In the example of FIG. 10, the flowchart 1000 continues to module 1010 with providing block IDs of the one or more blocks to a raw log. An entry in the raw log may include a session identifier (ID) associated with the block IDs. In some cases it may be desirable to format the entries as they are provided to the raw log. Any format known or convenient may be used. The raw log may be unformatted. A plurality of entries may be maintained, or the raw log may be sent upstream to a streaming software server as entries are generated.

It should be noted that in some cases, a streaming client will not be interested in waiting around for a streaming program to complete a clean-up routine. For example, if it takes time for a machine to close a streaming program when the user is finished with it, the user may turn off the computer or kill the program in some other manner. Thus, if the raw log is maintained on the client machine until the streaming session is over, and then attempts to send it, the raw log may never be sent. Accordingly, in one implementation, raw log entries are sent immediately to the streaming server as the entries are generated. A disadvantage of such an implementation is that formatting of the raw log may not be possible at the client.

In the example of FIG. 10, the flowchart 1000 continues to module 1012 with receiving the blocks. The blocks may include one or more components of a stream-enabled application. The virtualized environment may be executing on a computing device. An interface of the computing device may receive the blocks. Notably, the blocks could be received in advance of receiving a resource request (module 1006) by employing techniques such as background downloading of blocks, predictive streaming, and caching.

In the example of FIG. 10, the flowchart 1000 continues to module 1014 with satisfying the resource request of the virtually installed application. A subset of block data of the blocks may then be delivered to the virtually installed application via a virtual execution environment to satisfy the resource request. Having satisfied the resource request, the flowchart 1000 continues to decision point 1016 where it is determined whether additional requests are made.

In the example of FIG. 10, if it is determined that additional requests are made (1016—Yes), then the flowchart 1000 continues to module 1006 and proceeds as described previously. If, on the other hand, it is determined that additional requests are not made (1016—No), then the flowchart 1000 ends. It should be noted that a virtual environment may have no way of determining whether there are additional resource requests until the virtual environment actually intercepts such a request from the virtually installed application.

Figure 11:
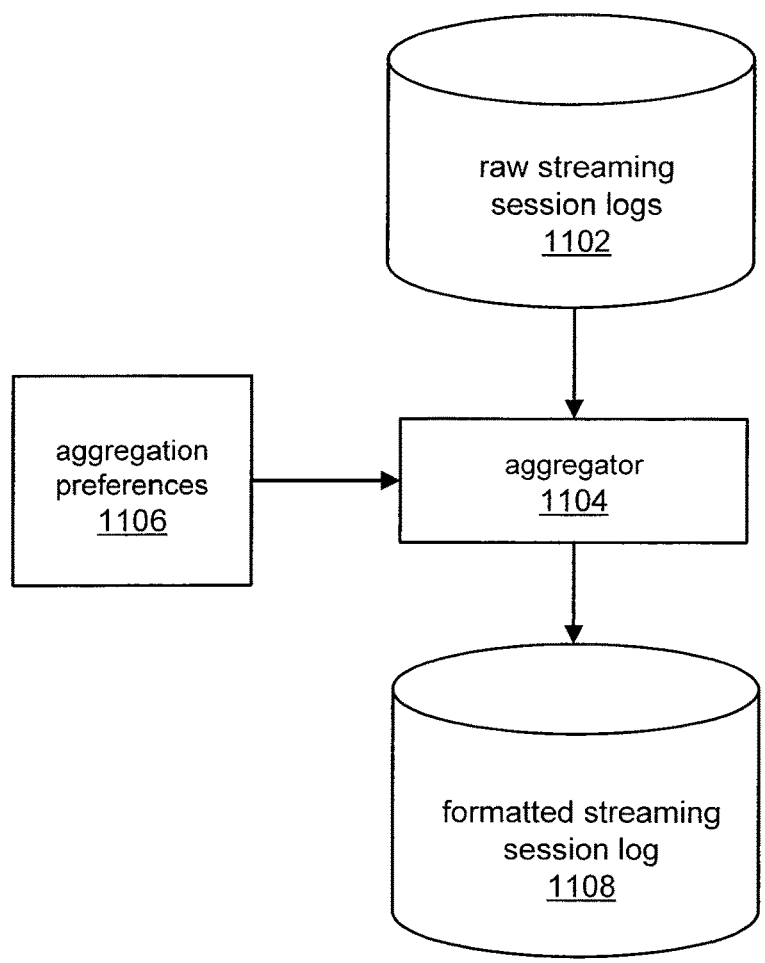
FIG. 11 depicts a diagram of an example of an aggregator producing a formatted log.

FIG. 11 depicts a diagram 1100 of an example of an aggregator producing a formatted log. The diagram 1100 includes raw streaming session logs 1102, aggregator 1104, aggregation preferences 1106, and formatted streaming session log 1108.

In the example of FIG. 11, the raw streaming session logs 1102 include one or more logs, a raw streaming session log including zero or more entries. An entry may include a unique session identifier (ID) and zero or more block IDs. The raw streaming session log 1102 may be unformatted, or any known or convenient format may be used. As was noted previously, although the raw streaming session logs 1102 may have a format, it is not referred to as such to avoid confusing the raw streaming session logs 1102 with the formatted streaming session log 1108.

In the example of FIG. 11, the aggregator 1104 may include a processor and memory. Memory may include random access memory (RAM), non-volatile (NV) storage, or any storage medium known or convenient. The memory may include instructions for formatting the raw streaming session log into the formatted streaming session log 1108.

In the example of FIG. 11, the aggregation preferences 1106 may include one or more user generated or predetermined preferences. Log formats may be included. Criteria for aggregating logs to focus on only a subset of block IDs or sessions may be included.

In the example of FIG. 11, formatted streaming session log 1108 may include entries of blocks associated with a session. The encoding of the formatted streaming session log 1108 could be a bit map with one bit associated with each block in the application. A set bit may indicate that the block associated with that bit was accessed. Another encoding could be to associate a unique session ID with a list of one or more block IDs. Any other encoding format known or convenient could be used.

In the example of FIG. 11, in operation, the aggregator 1104 may receive via one or more interfaces some or all of the raw streaming session log 1102, and the aggregation preferences 1106. The aggregator 1104, in accordance with the aggregation preferences 1106, may then aggregate block IDs in accordance with the aggregation preferences 1106. In a non-limiting example aggregator 1104 aggregates block statistics for a plurality of sessions by collating blocks IDs by unique session ID to produce the formatted log 1106. In a non-limiting example the aggregator 1104 produces a formatted streaming session log 1108 having a logical representation as a block-session grid.

Figure 12:
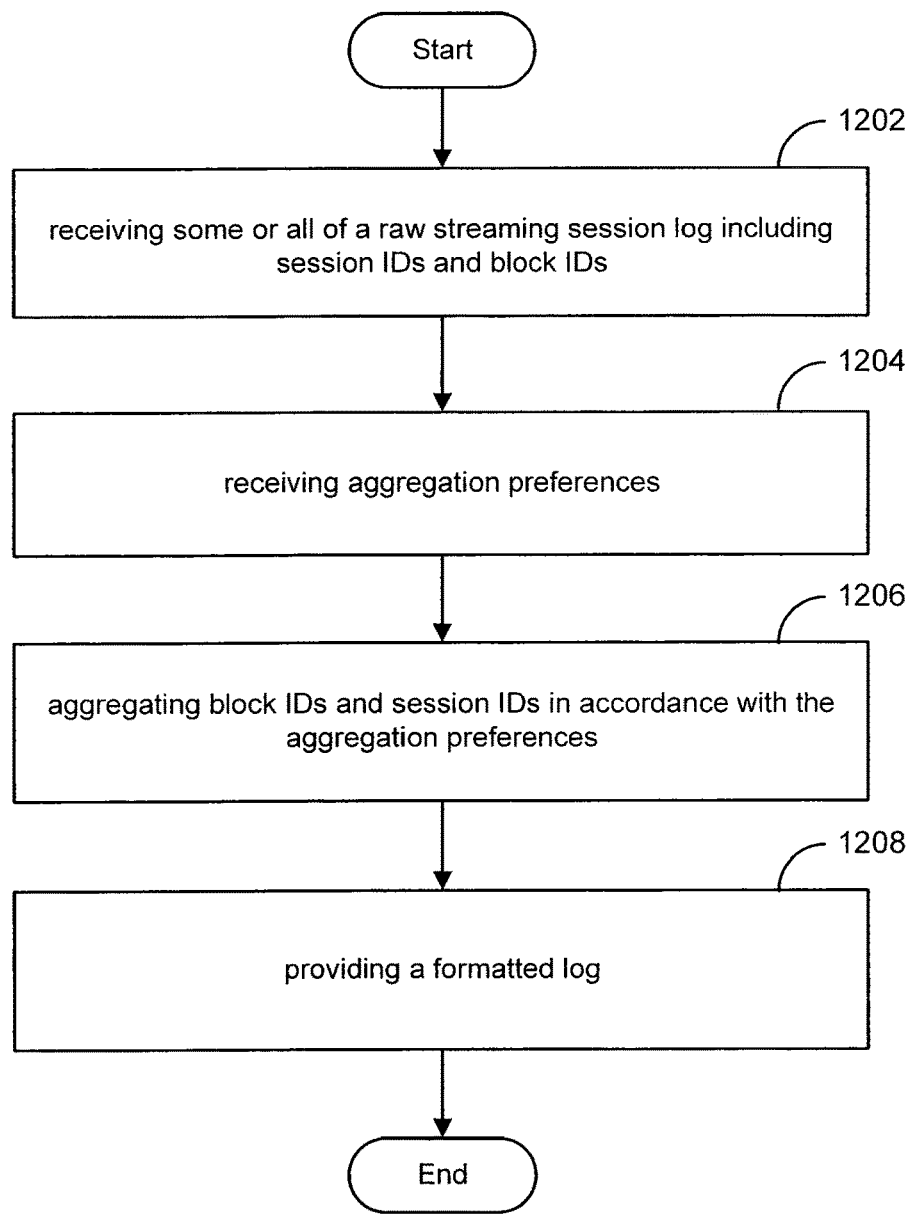
FIG. 12 depicts a flowchart of an example of a method for formatting a log.

FIG. 12 depicts a flowchart 1200 of an example of a method for formatting a log. The method is organized as a sequence of modules in the flowchart 1200. However, it should be understood that these and modules associated with other methods described herein may be reordered for parallel execution or into different sequences of modules.

In the example of FIG. 12, the flowchart 1200 starts at module 1202 with receiving one or more raw streaming session logs including session IDs and block IDs. The one or more raw streaming session logs may be received via an interface.

In the example of FIG. 12, the flowchart 1200 continues to module 1204 with receiving aggregation preferences. Aggregation preferences may be generated locally by a user, or received via a communication interface. Aggregation preferences may specify one or more log formats as well as criteria for aggregating a log.

In the example of FIG. 12, the flowchart 1200 continues to module 1206 with aggregating block IDs and session IDs in accordance with the aggregation preferences. One or more formatted logs may be produced. The encoding of the formatted log could be a logical block-session grid, a sequential list of unique session IDs with associated block IDs, or any other applicable known or convenient format.

In the example of FIG. 12, the flowchart 1200 continues to module 1208 with providing a formatted log. Providing may be accomplished via an interface, or via delivery to a local computing device. The formatted log may be stored in a file, database, or other known or convenient data structure. A known or convenient storage medium may be used. Having provided a formatted log, the flowchart 1200 terminates.

FIG. 13 depicts a diagram 1300 of an example of a block-session grid indicating requests for blocks during sessions. The diagram 1300 includes block-session grid 1302. Block-session grid 1302 presents an example of a grid for storing block access requests. If an entry in the grid is set to 1 then the given block was accessed in the corresponding session. In another way of formatting a log file, a block-session grid could be used to store a frequency count indicating an approximation of the total number of accesses for that block for the given session. In such a case, the values stored in the cells of the grid could be 0, 1, 2 . . . n, as opposed to a binary representation of 0 or 1.

Figure 14:
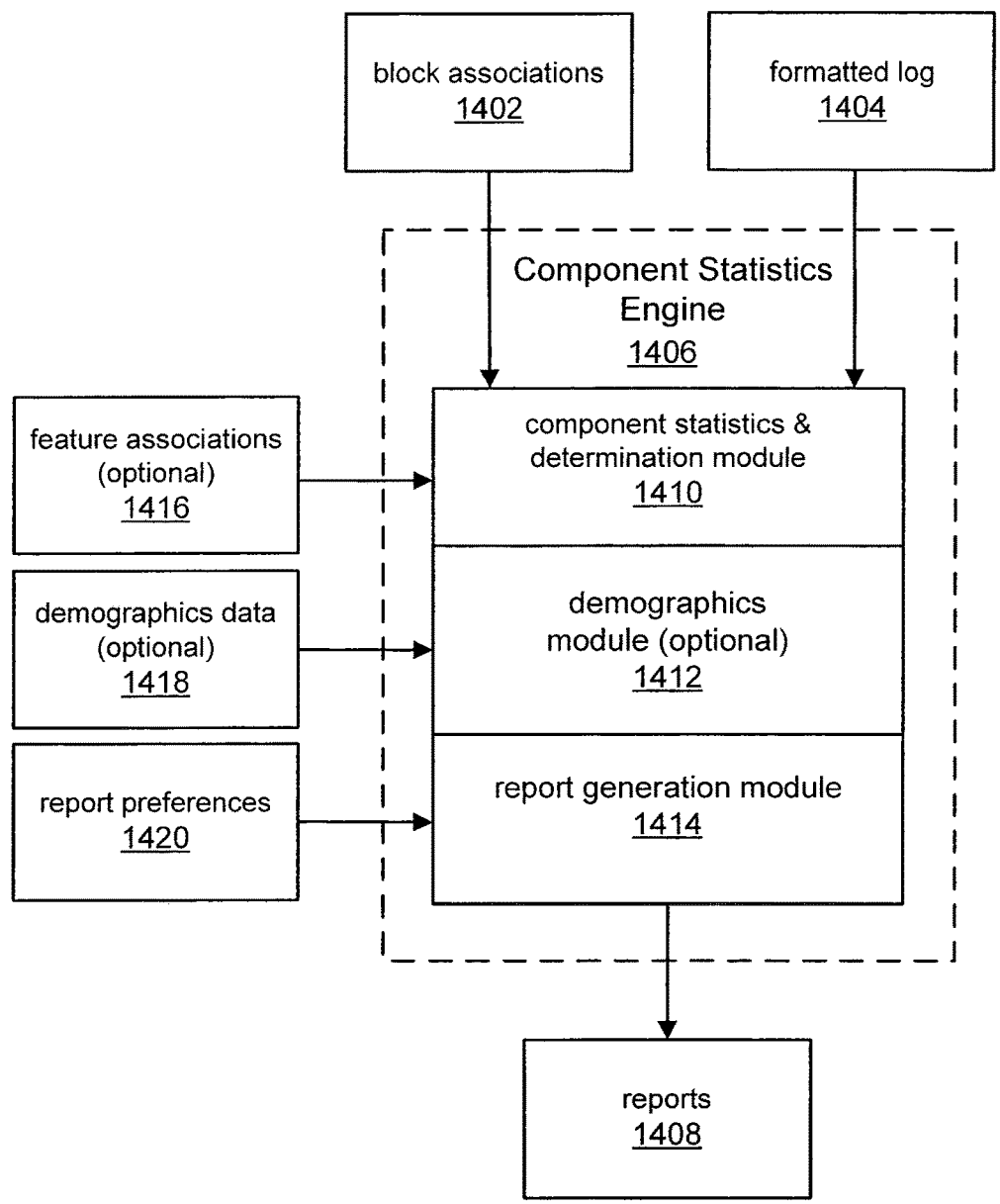
FIG. 14 depicts a diagram of an example of a component statistics engine generating report(s) including component statistics.

FIG. 14 depicts a diagram 1400 of an example of a component statistics engine generating report(s) including component statistics. The diagram 1400 includes block associations 1402, formatted log 1404, component statistics engine 1406, and report(s) 1408.

In the example of FIG. 14, the block associations 1402 may include relationships for each file, offset and length for a plurality of blocks and a plurality of deliverables.

In the example of FIG. 14, the formatted log file 1404 may include one or more entries. An entry may include a unique session identifier (ID) and zero or more block IDs. The formatted log file 1404 may be formatted in any manner known or convenient. In a non-limiting example, the format is a logical block-session grid, or a sequential list of sessions and block IDs.

In the example of FIG. 14, the component statistics engine 1406 may include component statistics & determination module 1410, optional demographics module 1412, and report generation module 1414. In the example of FIG. 14, the component statistics & determination module 1410 may include various functionality for analyzing log files using block associations, and optionally feature associations 1416. Feature associations 1416 may enable finer component analysis. A particular feature could be spread across multiple deliverables, in which case multiple files, offsets and lengths could be included in the feature associations to associate a feature with deliverables. Feature associations 1416 may include listings of tuples of files, offsets and lengths. Although optional, the feature associations 1416 could advantageously provide more detailed analysis of, e.g., functions/procedures.

In the example of FIG. 14, the optional demographics module 1412 may include functionality for identifying the use of components and functions by various users and groups of users. Optional demographics module 1412 may receive optional demographics data 1418. Demographics data 1418 may include information directed to various age groups, geographic locations, occupations, and any other group defining factor. In a non-limiting example, demographic data could be useful for distinguishing between urban and rural users to determine that a business address locating feature is more popular with urban users than with rural users.

In the example of FIG. 14, the report generation module 1414 includes various functionality to provide a formatted or unformatted report. In addition, the report generation module 1414 may receive optional report preferences 1420. In the example of FIG. 14, the report preferences 1406 may include user generated or precompiled options for generating reports. In a non-limiting example, a user might specify a set of unique sessions for analysis, or might specify known blocks for analysis to narrow the scope of statistics generated. Although the report preferences 1420 are optional, because the reports could be generated in a predetermined manner, report preferences will typically be desirable to ensure that reports are generated in a manner most useful for a given situation, application, enterprise, or person.

In the example of FIG. 14, the reports 1408 may include any formatted or unformatted data produced by the component statistics engine 1406. In a non-limiting example: a % of sessions that used a certain components could be included in a report. A % coverage, or amount of the streamed application used, could be included. A % coverage of an individual feature, or amount of an individual feature requested in terms of its associated blocks could be included.

In the example of FIG. 14, in operation, the component statistics engine 1406 receives the block associations 1402 and the formatted log file 1404, and outputs report(s) 1408. The component statistics & determination module processes the formatted log file 1404 using the block associations 1402. The processing involves determining which blocks were requested, and perhaps how many times the blocks were requested, per session. Then, using the block associations 1402 and the optional feature associations 1416, the component statistics engine 1406 may estimate how many times components were used by streaming clients (or consumers of stream-enabled application content). Optionally, the demographics module 1412 may apply the demographics data 1416 to analyze and further characterize the users of the components and/or identify usage of various components by demographic.

Optionally, the feature association module 1412 may provide fine analysis using feature associations 1416. Feature associations 1416 may be provided by the manufacturer of the deliverables prior to stream enabling. Feature associations are often confidential, and associated functionality may be normally disabled and may only be enabled if the feature association data is available. So, a stream enabler service might make use of the component statistics engine 1406 without the feature associations 1416, while a software deliverables manufacturer might make use of the component statistics engine 1406 with the feature association module. Alternatively, a service may utilize the component statistics engine 1406 as a tool for multiple parties, but only enable functionality associated with the feature associations 1416 for those parties that provide feature associations 1416.

The report generation module 1414 uses the data from the component statistics & determination module 1410 and optionally the demographics module 1412 to generate report(s) 1408. Optionally, the report generation module receives report preferences 1420 and creates a formatted or unformatted report in accordance with the preferences. A variety of reports may be generated. In a non-limiting example, a % of sessions that used a certain component could be included in a report; a % coverage, or percentage of the streamed application used, could be included; a % coverage of an individual feature, or amount of an individual feature requested could be included.

Figure 15:
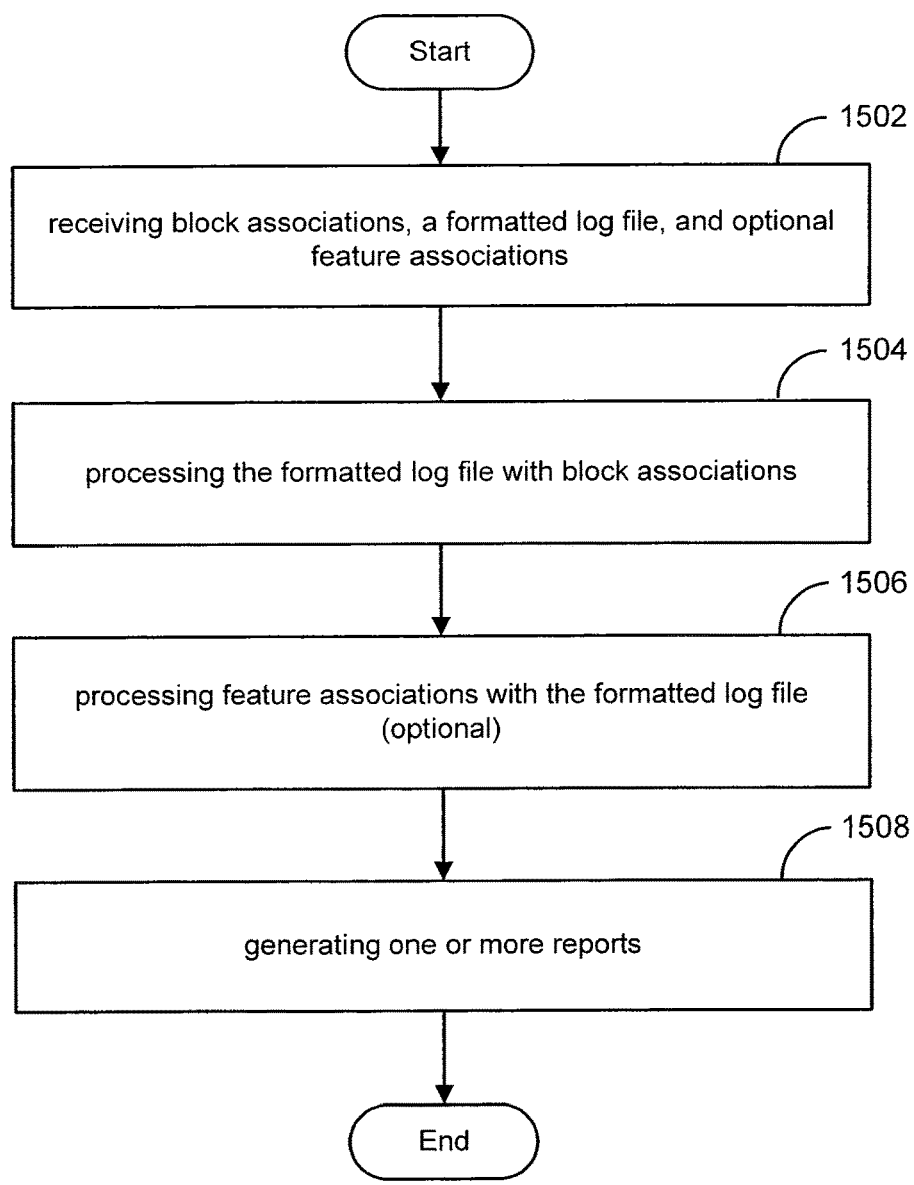
FIG. 15 depicts a flowchart of an example of a method for generating reports including component statistics.

FIG. 15 depicts a flowchart 1500 of an example of a method for generating reports including component statistics. The method is organized as a sequence of modules in the flowchart 1500. However, it should be understood that these and modules associated with other methods described herein may be reordered for parallel execution or into different sequences of modules.

In the example of FIG. 15, the flowchart 1500 starts at module 1502 with receiving block associations, a formatted log file, and optional feature associations. User preferences may also be received. Specifically, a user may specify statistics to be determined and/or desired reporting layout. Receiving may be accomplished via a network interface, an I/O interface, or some other known or convenient interface. Receiving may be accomplished by retrieving from a local storage medium.

In the example of FIG. 15, the flowchart 1500 continues to module 1504 with processing block associations with the formatted log file. Optionally, feature associations may be employed. For example, the popularity of a component may be estimated by determining the frequency of block requests for blocks associated with the component. Components that are used infrequently may also be identified.

Sometimes requesting a feature requires requesting more than one block. There, a number of blocks may be requested. In evaluating the number of block requests for the feature the number of associated block requests may be divided by the number of blocks of the feature to determine a number of requests for the feature. In a non-limiting example, 3 blocks are associated with components of a feature B. The three blocks are necessary to use feature B. 9 block requests are logged for the components of the feature B. The 9 block requests may be divided by the three blocks associated with the feature to determine that the feature was requested 3 times.

In the example of FIG. 15, the flowchart 1500 continues to module 1506 with optionally processing the formatted log file (or the results of module 1504) with feature associations. For example, a popularity of a feature may be estimated by determining the frequency of block requests for blocks associated with the feature. Features may be spread across not-necessarily-sequential blocks.

In the example of FIG. 15, the flowchart 1500 continues to module 1508 with generating one or more reports. Reports associated with coverage and usage may be generated. Having generated one or more reports from a formatted log file and block associations, the flowchart terminates.

Figure 16:
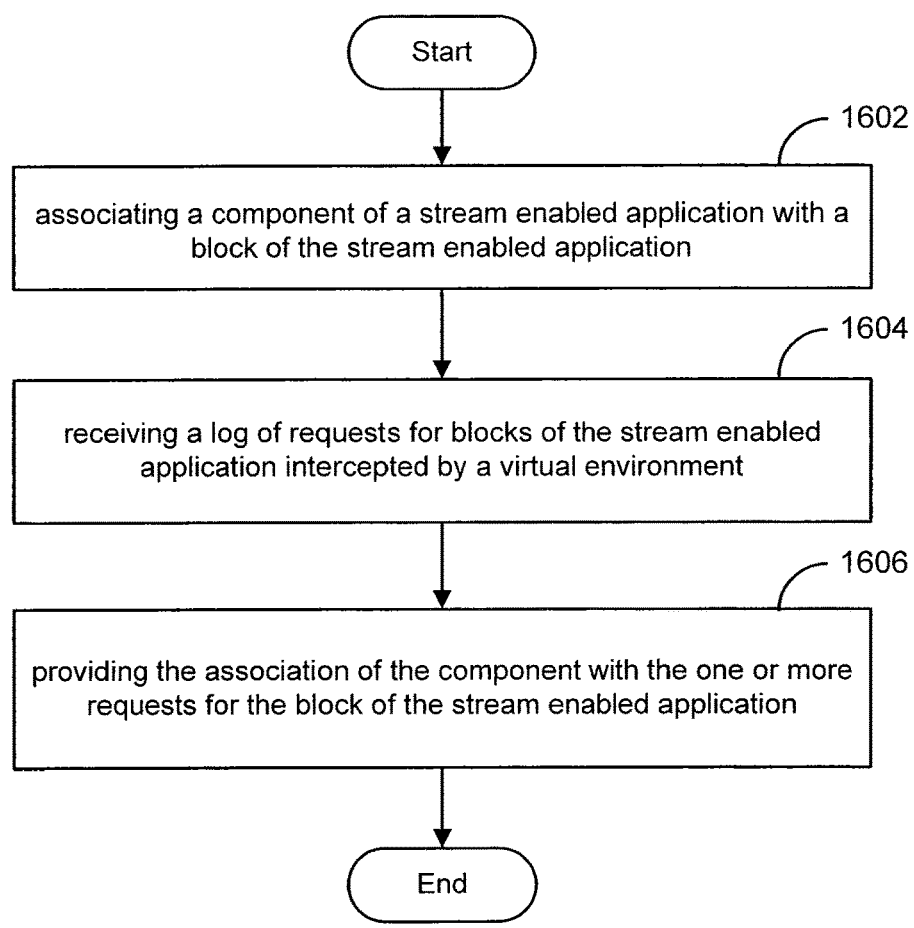
FIG. 16 depicts a flowchart of an example of a method for associating a component of a stream-enabled application with one or more requests for a block of a stream-enabled application.

FIG. 16 depicts a flowchart 1600 of an example of a method for associating a component of a stream-enabled application with one or more requests for a block of a stream-enabled application. The method is organized as a sequence of modules in the flowchart 1600. However, it should be understood that these and modules associated with other methods described herein may be reordered for parallel execution or into different sequences of modules.

In the example of FIG. 16, the flowchart 1600 starts at module 1602 with associating a component of a stream-enabled application with a block of the stream-enabled application. This may be accomplished such as by using feature associations with block associations.

In the example of FIG. 16, the flowchart 1600 continues to module 1604 with receiving logs of requests for blocks of the stream-enabled application intercepted by a virtual environment. This may be accomplished such as by collecting a formatted log.

In the example of FIG. 16, the flowchart 1600 continues to module 1606 with providing the association of the component with the one or more requests for the stream-enabled application. A file including the association may be generated, or alternatively, the association may be transmitted. Having associated requests for blocks with components, the flowchart 1600 ends.

Figure 17:
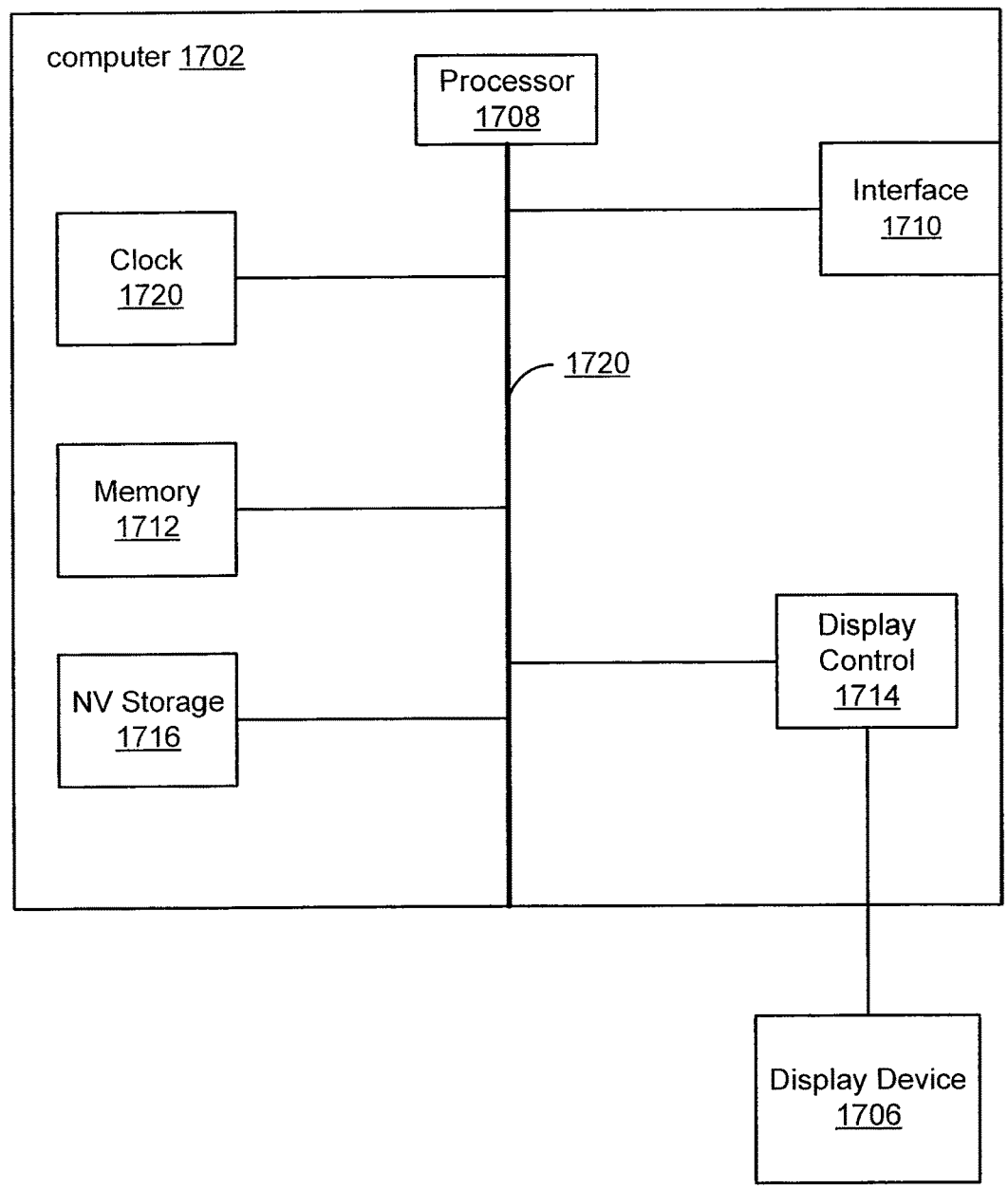
FIG. 17 depicts a diagram of an example of a system capable of determining component statistics.

FIG. 17 depicts an example of a system 1700 capable of determining component statistics. The computing system 1700 may be a conventional computing system that can be used as a client computing system, such as a wireless client or a workstation, or a server computing system. The computing system 1700 includes a computer 1702, and a display device 1706. The computer 1702 includes a processor 1708, interface 1710, memory 1712, display controller 1714, and non-volatile storage 1716. The computer 1702 may be coupled to or include display device 1706.

The computer 1702 interfaces to external systems through the interface 1710, which may include a modem, network interface, CD-ROM drive, DVD-ROM drive, or any known or convenient interface. An interface may include one or more input-output devices. Interface 1710 may include one or more interfaces. An interface may include a device for reading a fixed media. An interface may receive deliverables. An interface may transmit a stream-enabled application. It will be appreciated that the interface 1710 can be considered to be part of the computing system 1700 or a part of the computer 1702. The interface 1710 can be an analog modem, ISDN modem, cable modem, token ring interface, satellite transmission interface (e.g. "direct PC"), or other interface for coupling a computing system to other computing systems.

The processor 1708 may be, for example, a conventional microprocessor such as an Intel Pentium microprocessor or Motorola power PC microprocessor. The memory 1712 is coupled to the processor 1708 by a bus 1720. The memory 1712 can be Dynamic Random Access Memory (DRAM) and can also include Static RAM (SRAM). The bus 1720 couples the processor 1708 to the memory 1712, also to the non-volatile storage 1716, and to the display controller 1714.

The non-volatile storage 1716 is often a magnetic hard disk, an optical disk, or another form of storage for large amounts of data. Some of this data is often written, by a direct memory access process, into memory 1712 during execution of software in the computer 1702. One of skill in the art will immediately recognize that the terms "machine-readable medium" or "computer-readable medium" includes any type of storage device that is accessible by the processor 1708 and also encompasses a carrier wave that encodes a data signal.

The computing system 1700 is one example of many possible computing systems which have different architectures. For example, personal computers based on an Intel microprocessor often have multiple buses, one of which can be an I/O bus for the peripherals and one that directly connects the processor 1708 and the memory 1712 (often referred to as a memory bus). The buses are connected together through bridge components that perform any necessary translation due to differing bus protocols.

Network computers are another type of computing system that can be used in conjunction with the teachings provided herein. Network computers do not usually include a hard disk or other mass storage, and the executable programs are loaded from a network connection into the memory 1712 for execution by the processor 1708. A Web TV system, which is known in the art, is also considered to be a computing system, but it may lack some of the features shown in FIG. 17, such as certain input or output devices. A typical computing system will usually include at least a processor, memory, and a bus coupling the memory to the processor.

In addition, the computing system 1700 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 1716 and causes the processor 1708 to execute the various acts required by the operating system to input and output data and to store data in memory, including storing files on the non-volatile storage 1716.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers or other such information storage, transmission or display devices.

The teachings included herein also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computing system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, there is no reference to any particular programming language, and various examples may be implemented using a variety of programming languages.

It will be appreciated to those skilled in the art that the preceding examples are not limiting in scope. It is intended that all permutations, enhancements, equivalents, and improvements thereto that are apparent to those skilled in the art upon a reading of the specification and a study of the drawings are included within the true spirit and scope of these teachings. It is therefore intended that the following appended claims include all such modifications, permutations, and equivalents as fall within the true spirit and scope of these teachings.

The invention claimed is:

1. A method comprising:
virtually installing an application, the installing including instantiating an instance of the application within a virtualized environment, the virtualized environment including an agent process associated with logging, the agent process having an associated delta transmission protocol;
generating a session identifier for the virtually installed application;
receiving one or more resource requests from the virtually installed application;
translating the one or more resource requests into a list including one or more blocks, the one or more blocks including one or more components of the virtually installed application;
providing the session identifier and block IDs of the one or more blocks to a raw log;
receiving the one or more blocks;
delivering a subset of block data of the one or more blocks to the virtualized environment;
satisfying the one or more resource requests of the virtually installed application using the subset of block data of the one or more blocks;
generating block access statistics from the raw log;
buffering, by the agent process, the block IDs of the one or more blocks;
transmitting, by the agent process, the buffer to subsequent logging processes.

2. The method of claim 1, wherein a prior installation of the virtualized environment is required before instantiating the instance of the application within the virtualized environment.

3. The method of claim 1, wherein the virtually installed application is executed multiple times and the method further comprises generating a session identifier for each instance of the virtually installed application.

4. The method of claim 1, wherein the virtually installed application is executed concurrently in multiple virtualized environments and the method further comprises generating a session identifier for each instance of the virtually installed application.

5. The method of claim 1, wherein the session identifier is used by the virtually installed application to identify itself as a source of a request for blocks, and as a destination for the blocks.

6. The method of claim 1, further comprising:
using predictive streaming to determine resources that are likely to be requested by the virtually installed application;
adding, to the virtually installed application, the resources that are likely to be requested by the virtually installed application.

7. The method of claim 1, wherein the one or more blocks include one or more components of a stream-enabled application.

8. The method of claim 1, wherein an entry in the raw log associates the session identifier with the block IDs of the one or more blocks.

9. The method of claim 8, further comprising maintaining a plurality of entries in the raw log.

10. The method of claim 8, further comprising sending the raw log upstream to a streaming software server as entries are generated.

11. The method of claim 1, further comprising formatting the raw log.

12. A system comprising:
means for virtually installing an application, the installing including instantiating an instance of the application within a virtualized environment, the virtualized environment including an agent process associated with logging, the agent process having an associated delta transmission protocol;
means for generating a session identifier for the virtually installed application;
means for receiving one or more resource requests from the virtually installed application;
means for translating the one or more resource requests into a list including one or more blocks, the one or more blocks including one or more components of the virtually installed application;
means for providing the session identifier and block IDs of the one or more blocks to a raw log;
means for receiving the one or more blocks;
means for delivering a subset of block data of the one or more blocks to the virtualized environment;
means for satisfying the one or more resource requests of the virtually installed application using the subset of block data of the one or more blocks;
means for generating block access statistics from the raw log;
means for buffering the block IDs of the one or more blocks;
means for transmitting the buffer to subsequent logging processes.

13. The system of claim 12, wherein a prior installation of the virtualized environment is required before instantiating the instance of the application within the virtualized environment.

14. The system of claim 12, wherein the virtually installed application is executed multiple times and the system further comprises means for generating a session identifier for each instance of the virtually installed application.

15. The system of claim 12, wherein the virtually installed application is executed concurrently in multiple virtualized environments and the system further comprises means for generating a session identifier for each instance of the virtually installed application.

16. The system of claim 12, wherein the session identifier is used by the virtually installed application to identify itself as a source of a request for blocks, and as a destination for the blocks.

17. The system of claim 12, further comprising:
means for using predictive streaming to determine resources that are likely to be requested by the virtually installed application;
means for adding, to the virtually installed application, the resources that are likely to be requested by the virtually installed application.

18. The system of claim 12, wherein the one or more blocks include one or more components of a stream-enabled application.

19. The system of claim 12, wherein an entry in the raw log associates the session identifier with the block IDs of the one or more blocks.

20. The system of claim 19, further comprising means for maintaining a plurality of entries in the raw log.

21. The system of claim 19, further comprising means for sending the raw log upstream to a streaming software server as entries are generated.

\* \* \* \* \*